United States Patent
Haraguchi et al.

(10) Patent No.: US 12,473,164 B2
(45) Date of Patent: Nov. 18, 2025

(54) SHEET SEPARATION DEVICE, SHEET LAMINATOR, AND IMAGE FORMING SYSTEM

(71) Applicants: Yohsuke Haraguchi, Kanagawa (JP); Akira Kunieda, Tokyo (JP); Ryohsuke Akaishi, Kanagawa (JP); Hirofumi Horita, Kanagawa (JP); Satoshi Kuno, Tokyo (JP); Koju Kawakami, Tokyo (JP); Yasunobu Kidoura, Kanagawa (JP)

(72) Inventors: Yohsuke Haraguchi, Kanagawa (JP); Akira Kunieda, Tokyo (JP); Ryohsuke Akaishi, Kanagawa (JP); Hirofumi Horita, Kanagawa (JP); Satoshi Kuno, Tokyo (JP); Koju Kawakami, Tokyo (JP); Yasunobu Kidoura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/724,837

(22) PCT Filed: Feb. 3, 2023

(86) PCT No.: PCT/IB2023/050953
§ 371 (c)(1),
(2) Date: Jun. 27, 2024

(87) PCT Pub. No.: WO2023/152614
PCT Pub. Date: Aug. 17, 2023

(65) Prior Publication Data
US 2025/0074732 A1    Mar. 6, 2025

(30) Foreign Application Priority Data

Feb. 10, 2022 (JP) .................................. 2022-019403
Dec. 9, 2022 (JP) .................................. 2022-197154

(51) Int. Cl.
*B65H 7/20* (2006.01)
*B65H 5/06* (2006.01)
(Continued)

(52) U.S. Cl.
CPC ............... *B65H 7/20* (2013.01); *B65H 5/062* (2013.01); *G03G 15/6582* (2013.01);
(Continued)

(58) Field of Classification Search
CPC .......... B32B 2037/0061; B32B 37/142; B32B 37/0053; B32B 37/185; B65H 2801/27;
(Continued)

(56) References Cited

U.S. PATENT DOCUMENTS

| 7,946,326 B2 * | 5/2011 | Lee ........................ B65H 3/446 156/367 |
| 2019/0161301 A1 | 5/2019 | Maeyama et al. |

(Continued)

FOREIGN PATENT DOCUMENTS

| JP | H9164593 A | 6/1997 |
| JP | 2006-160429 A | 6/2006 |
| JP | 2020-179584 A | 11/2020 |

OTHER PUBLICATIONS

International Search Report and Written Opinion issued on May 4, 2023 in PCT/IB2023/050953 filed on Feb. 3, 2023.

*Primary Examiner* — Jessica L Eley
(74) *Attorney, Agent, or Firm* — Harness, Dickey & Pierce, P.L.C.

(57) ABSTRACT

A sheet separation device includes a sheet separation unit, a displacement detector, a displacement adjuster, and a controller. The sheet separation unit performs a sheet separating operation and a sheet inserting operation. The displacement detector detects a displacement amount of the two-ply sheet when the two-ply sheet is displaced in a width direction of
(Continued)

the two-ply sheet and detects a displacement amount of the inner sheet. The displacement adjuster adjusts the displacement of the two-ply sheet in the width direction before the sheet separating operation, based on the displacement amount of the two-ply sheet in the width direction detected by the displacement detector. The controller causes the displacement adjuster to adjust relative positions of the two-ply sheet and the inner sheet between the sheet separating operation and the sheet inserting operation, based on the displacement amount of the inner sheet in the width direction detected by the displacement detector.

17 Claims, 23 Drawing Sheets

(51) Int. Cl.
  *G03G 15/00* (2006.01)
  *B32B 37/00* (2006.01)

(52) U.S. Cl.
  CPC ............... *B32B 2037/0061* (2013.01); *B65H 2301/44318* (2013.01); *B65H 2301/514* (2013.01); *B65H 2553/40* (2013.01); *B65H 2801/27* (2013.01)

(58) Field of Classification Search
  CPC .... B65H 5/301; B65H 5/305; G03G 15/6582; G03G 15/6585; G03G 15/6511; G03G 15/2028
  See application file for complete search history.

(56) References Cited

U.S. PATENT DOCUMENTS

| | | |
|---|---|---|
| 2020/0247107 A1* | 8/2020 | Morinaga ............... B32B 37/18 |
| 2020/0247636 A1* | 8/2020 | Furuhashi ............ B65H 29/125 |
| 2020/0338877 A1 | 10/2020 | Takahashi et al. |
| 2020/0341414 A1* | 10/2020 | Watanabe .......... G03G 15/2028 |
| 2022/0153008 A1 | 5/2022 | Takahashi et al. |
| 2022/0291620 A1 | 9/2022 | Fujita et al. |

* cited by examiner

FIG. 6A
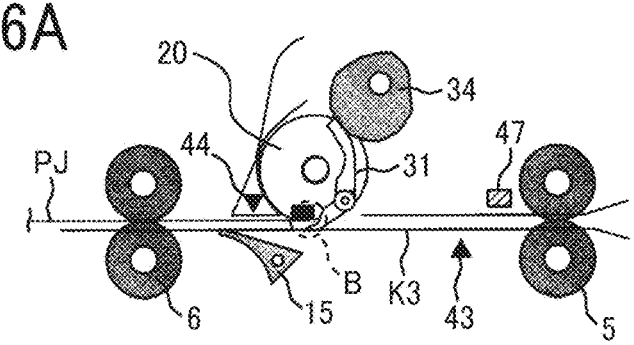
FIG. 6B
FIG. 6B'
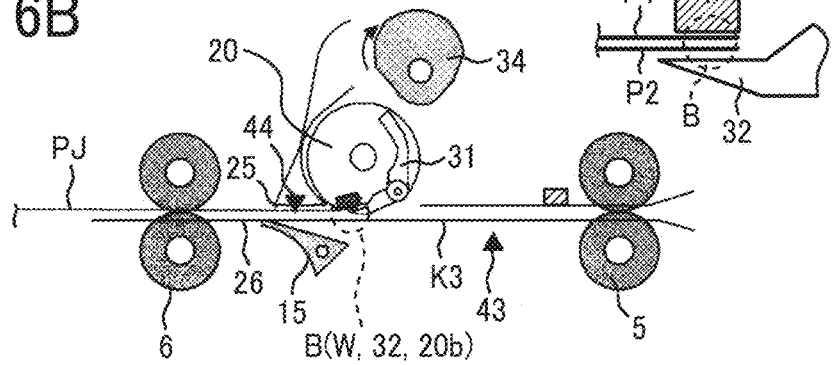
FIG. 6C
FIG. 6C'
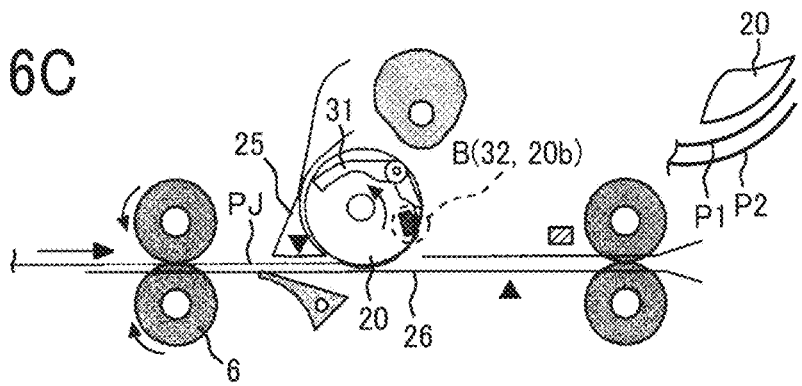
FIG. 6D
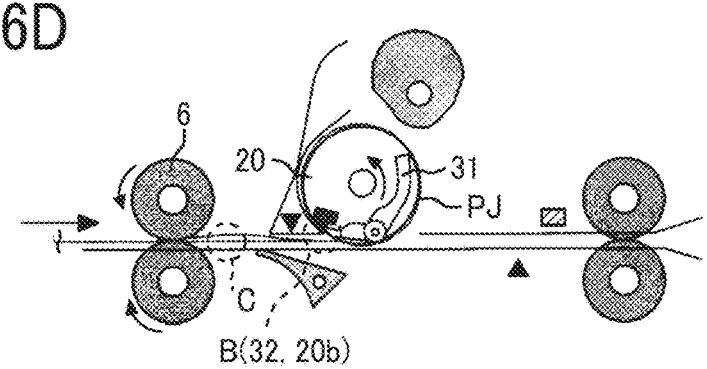

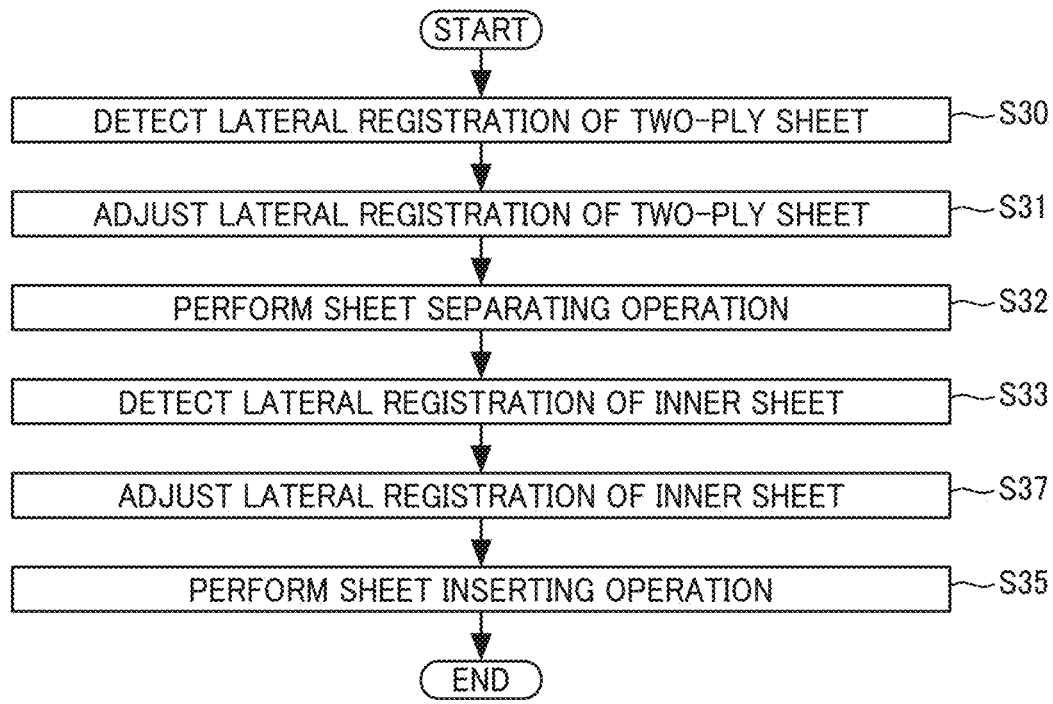
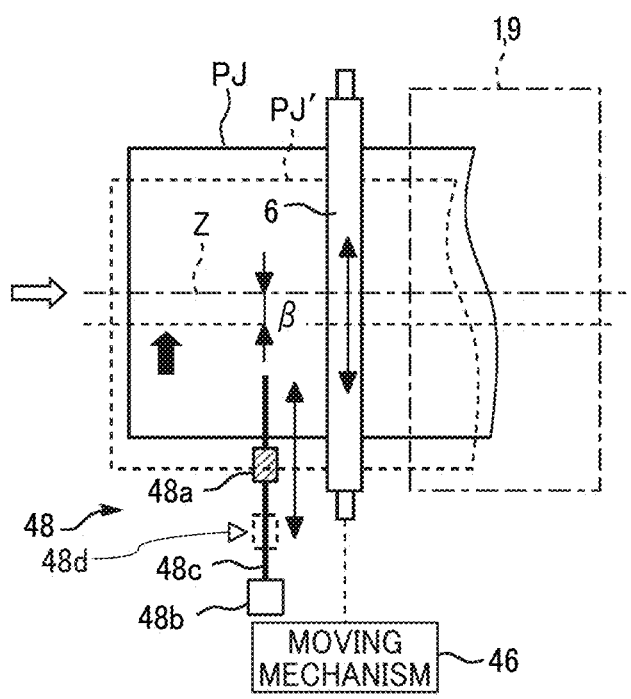

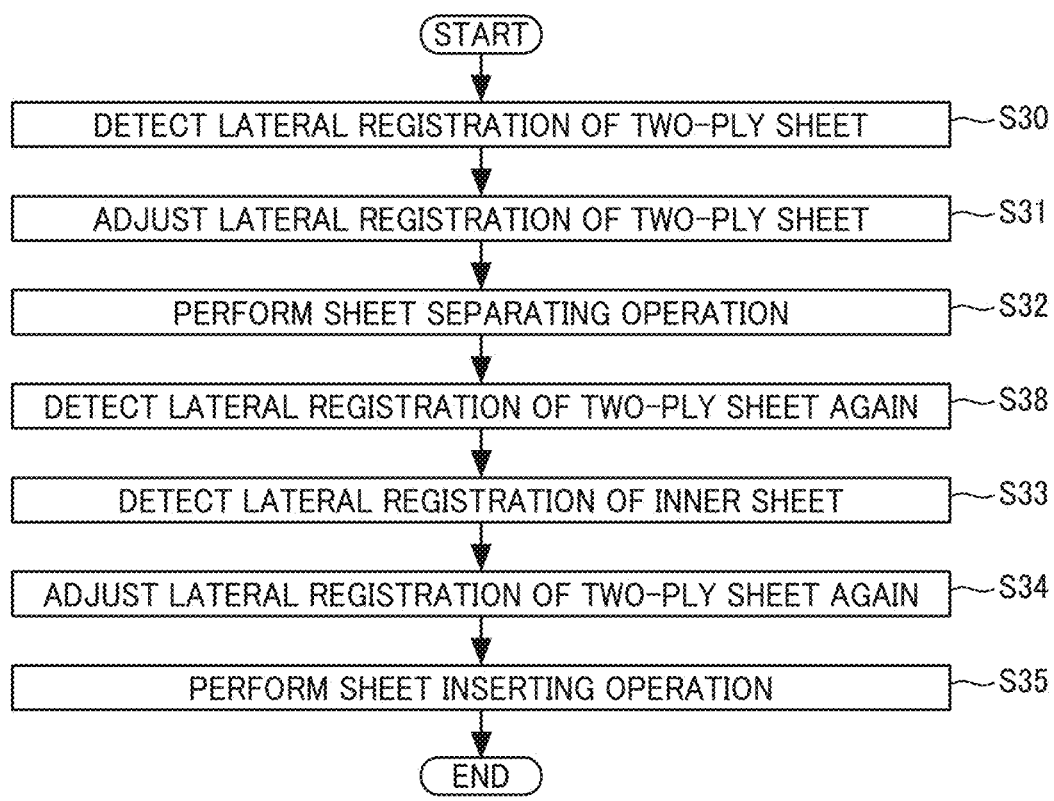

FIG. 21

SHEET POSITION ADJUSTMENT SETTING

| ADJUSTMENT AMOUNT OF FILM POSITION (MAIN SCANNING DIRECTION) | + 2.0 mm |
| ADJUSTMENT AMOUNT OF INNER SHEET INSERTION POSITION (MAIN SCANNING DIRECTION) | − 1.0 mm |

SETTING COMPLETED

FIG. 22A

SHEET SIZE SETTING

| FILM SIZE | A4 |
| INNER SHEET SIZE | A4 |

SETTING COMPLETED

SHEET SIZE SETTING (DETAILS)

| FILM SIZE (MAIN SCANNING) | 216.0 mm | FILM SIZE (SUB SCANNING) | 303.0 mm |
| --- | --- | --- | --- |
| INNER SHEET SIZE (MAIN SCANNING) | 210.0 mm | INNER SHEET SIZE (SUB SCANNING) | 297.0 mm |

SETTING COMPLETED

SHEET SEPARATION DEVICE, SHEET LAMINATOR, AND IMAGE FORMING SYSTEM

CROSS-REFERENCE TO RELATED APPLICATIONS

This application is a national phase under 35 U.S.C. § 371 of PCT International Application No. PCT/IB2023/050953 which has an International filing date of Feb. 3, 2023, which claims priority to Japanese Application No. 2022-019403, filed Feb. 10, 2022 and Japanese Application No. 2022-197154, filed Dec. 9, 2022, the entire contents of each of which are hereby incorporated by reference.

TECHNICAL FIELD

Embodiments of the present disclosure relate to a sheet separation device to separate the non-bonding portion of a two-ply sheet in which two sheets are overlapped and bonded together at the bonding portion of the two-ply sheet, a sheet laminator including the sheet separation device, and an image forming system including the sheet separation device.

BACKGROUND ART

Various types of sheet separation devices in the related art are known to separate a two-ply sheet in which two sheets are overlapped and bonded together at one ends as a bonding portion and insert an inner sheet between the two sheets separated from each other (for example, see Japanese Unexamined Patent Application Publication No. 2020-179584). Specifically, a sheet separation device in the related art (Japanese Unexamined Patent Application Publication No. 2020-179584) separates two sheets of a lamination sheet (e.g., a two-ply sheet) by a sheet separation unit including, for example, a winding roller, and then inserts a protective paper (e.g., an inner sheet) between the two sheets of the lamination sheet. The two sheets are bonded at one ends of the lamination sheet.

CITATION LIST

Patent Literature

[PTL 1]
Japanese Unexamined Patent Application Publication No. 2020-179584

SUMMARY OF INVENTION

Problems to be Solved

Such a sheet separation device in the art has an inconvenience in which the sheet separating operation is not preferably performed on a two-ply sheet when the position of the two-ply sheet is displaced in the width direction in the conveyance passage or an inconvenience in which the sheet inserting operation is performed on the inner sheet while the position of the inner sheet is relatively displaced in the width direction with respect to the two-ply sheet.

The present disclosure is made in light of solving the above-described inconveniences and an object of the present disclosure is to provide a sheet separation device, a sheet laminator, and an image forming system, which can preferably separate two sheets of a two-ply sheet and insert an inner sheet into the two-ply sheet without displacement of the inner sheet in the width direction.

Solution to Problem

A sheet separation device according to an embodiment of the present disclosure includes: a sheet separation unit to perform a sheet separating operation of separating a non-bonding portion of a two-ply sheet in which two sheets are overlapped and bonded together at a bonding portion of the two-ply sheet, and perform a sheet inserting operation of inserting an inner sheet between the two sheets of the two-ply sheet separated in the sheet separating operation; a displacement detector to detect a displacement amount of the two-ply sheet in a width direction of the two-ply sheet orthogonal to a sheet conveyance direction in which the two-ply sheet is conveyed toward the sheet separation unit, and detect a displacement amount of the inner sheet, which is conveyed toward the sheet separation unit, in the width direction; a displacement adjuster to adjust a displacement of the two-ply sheet in the width direction before the sheet separating operation, based on the displacement amount of the two-ply sheet detected by the displacement detector; and a controller to cause the displacement adjuster to adjust relative positions of the two-ply sheet and the inner sheet in the width direction between the sheet separating operation and the sheet inserting operation, based on the displacement amount of the inner sheet detected by the displacement detector.

Advantageous Effects of Invention

According to an embodiment of the present disclosure, a sheet separation device, a sheet laminator, and an image forming system are provided to preferably separate two sheets of a two-ply sheet and insert an inner sheet into the two-ply sheet without displacement of the inner sheet in the width direction.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIGS. 6A, 6B, 6B', 6C, 6C', and 6D are schematic views of the sheet separation device, each illustrating the sheet separating operation performed in the sheet separation device, subsequent from the sheet separating operation of FIGS. 5A, 5B, 5C, and 5D.

FIG. 17 is a flowchart illustrating the control process executed in the sheet separation device of FIG. 16 to adjust the relative positions of the two-ply sheet and an inner sheet.

FIG. 18 is a top view of the displacement adjuster and the area around the displacement adjuster, according to Modification 2 of an embodiment of the present disclosure.

FIG. 19 is a flowchart illustrating the control process executed in the sheet separation device of FIG. 18 to adjust the relative positions of the two-ply sheet and the inner sheet.

FIG. 21 is a diagram illustrating a display screen of an operation display panel, according to Modification 4 of an embodiment of the present disclosure.

FIGS. 22A and 22B are diagrams, each illustrating another display screen of the operation display panel.

FIG. 23 is a diagram illustrating a sheet laminator according to Modification 5 of an embodiment of the present disclosure.

DESCRIPTION OF EMBODIMENTS

Figure 1:
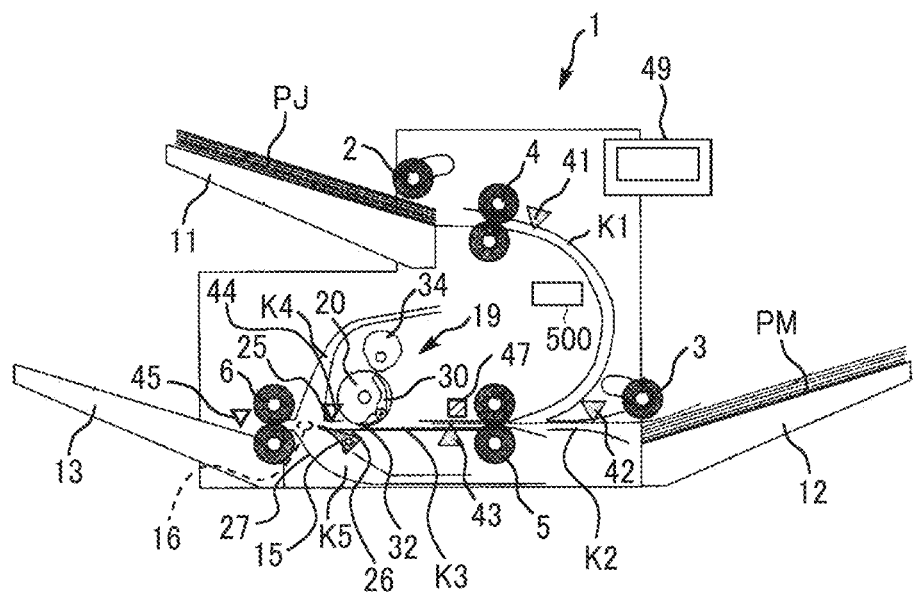
FIG. 1 is a schematic diagram illustrating an overall configuration of a sheet separation device according to an embodiment of the present disclosure.

Next, a description is given of embodiments of the present disclosure, with reference to the accompanying drawings. Identical reference numerals are assigned to identical components or equivalents and redundant descriptions of those components may be simplified or omitted.

A description is given of the overall configuration and operations of a sheet separation device 1, with reference to FIG. 1.

FIG. 1 is a schematic diagram illustrating an overall configuration of the sheet separation device 1 according to an embodiment of the present disclosure.

Figure 5A:
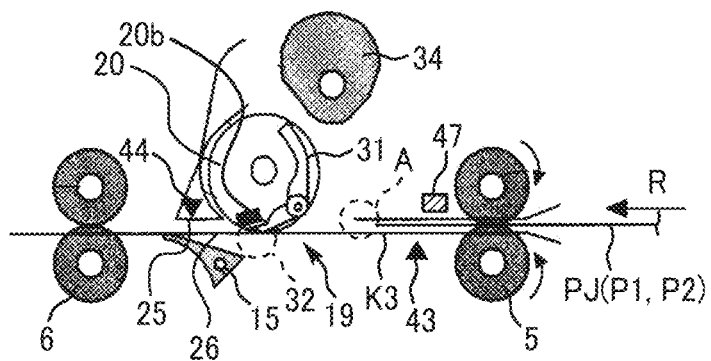
FIGS. 5A, 5B, 5C, and 5D are schematic views of the sheet separation device, each illustrating a sheet separating operation performed in the sheet separation device illustrated in FIG. 1.

The sheet separation device 1 includes a sheet separation unit 19 that separates the non-bonding portion of a two-ply sheet PJ in which two sheets, which are a first sheet P1 and a second sheet P2, are overlapped and bonded together at a bonding portion A of the two-ply sheet PJ (see FIG. 5A).

The sheet separation unit 19 performs the sheet separating operation and the sheet inserting operation. To be more specific, the sheet separation unit 19 performs the sheet separating operation to separate the non-bonding portion of the two-ply sheet PJ. The sheet separation unit 19 then performs the sheet inserting operation to insert the inner sheet PM between the first sheet P1 and the second sheet P2 separated from each other in the sheet separating operation.

Specifically, as illustrated in FIG. 1, the sheet separation device 1 includes the operation display panel 49 that functions as an operation display on the exterior of the sheet separation device 1. The operation display panel 49 is to display various kinds of information about the sheet separation device 1 or is to accept inputs of various kinds of commands by the user.

In particular, in the present embodiment, the two-ply sheet PJ is made of the first sheet P1 and the second sheet P2 overlapped and bonded together at one side of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding, and the other side of the first sheet P1 and the other side of the second sheet P2 are not bonded (attached). As the first sheet P1 and the second sheet P2 of the two-ply sheet PJ, a transparent film sheet (that is, a lamination sheet) may be employed.

The two-ply sheet PJ may be made by folding a single sheet. In the present disclosure, the two-ply sheet PJ made by folding a single sheet is also defined as the two sheets overlapped, a folded portion of the folded single sheet is defined as the "bonding portion", and the other portions are defined as the "non-bonding portion" or the "non-bonding portions".

The sheet separation unit 19 separates the non-bonding portion of the two sheets P1 and P2 of the two-ply sheet PJ between a winding roller 20 and the third conveyance roller pair 6, in other words, separates the two sheets P1 and P2 of the two-ply sheet PJ around the bonding portion A that maintains bonding of the first sheet P1 and the second sheet P2. Subsequently, the sheet separation device 1 (the sheet separation unit 19) performs an operation in which the inner sheet PM is inserted between the separated two sheets, which are the first sheet P1 and the second sheet P2 of the two-ply sheet PJ. The inner sheet PM is a sheet such as one plain sheet.

As illustrated in FIG. 1, the sheet separation device 1 includes the sheet separation unit 19, a first sheet tray 11, a second sheet tray 12, a first feed roller 2, a second feed roller 3, a first conveyance roller pair 4, a second conveyance roller pair 5, a third conveyance roller pair 6, an ejection tray 13, a first sensor 41, a second sensor 42, a third sensor 43, a fourth sensor 44, a fifth sensor 45, a displacement detector 47, a first guide 25 serving as an inner restraint, a second guide 26 serving as an outer restraint, and a third guide 27.

The sheet separation unit 19 further includes the winding roller 20, a moving mechanism 30, switching claws 15, and separation claws 16.

The sheet separation device 1 further includes a plurality of sheet conveyance passages such as a first sheet conveyance passage K1 (curved conveyance passage), a second sheet conveyance passage K2, a third sheet conveyance passage K3, a first branched sheet conveyance passage K4, and a second branched sheet conveyance passage K5. Each of the first sheet conveyance passage K1, the second sheet conveyance passage K2, the third sheet conveyance passage K3, the first branched sheet conveyance passage K4, and the second branched sheet conveyance passage K5 includes two conveyance guides (guide plates) facing each other to guide and convey the sheet such as the two-ply sheet PJ and the inner sheet PM.

To be more specific, the two-ply sheet PJ is stacked on the first sheet tray 11. The first feed roller 2 feeds the uppermost two-ply sheet PJ on the first sheet tray 11, to the first conveyance roller pair 4, and the first conveyance roller pair 4 conveys the two-ply sheet PJ along the first sheet conveyance passage K1.

Further, the inner sheet PM is stacked on the second sheet tray 12. Then, the second feed roller 3 feeds the uppermost inner sheet PM on the second sheet tray 12.

Each of the first conveyance roller pair 4, the second conveyance roller pair 5, and the third conveyance roller pair 6 includes a drive roller and a driven roller each having an elastic layer made of, for example, rubber formed on a core, and conveys the sheet nipped by the respective nip regions formed by the drive roller and the driven roller. The third sheet conveyance passage K3 is a passage from the second conveyance roller pair 5 to the third conveyance roller pair 6 and provided with the second conveyance roller pair 5, the winding roller 20, and the third conveyance roller pair 6 in this order from upstream to downstream in the sheet conveyance direction. In particular, the third conveyance roller pair 6 is rotatable in forward to convey the sheet in the forward direction or in reverse to convey the sheet in the reverse direction. The third conveyance roller pair 6 also functions as an ejection roller pair that ejects the sheet to the ejection tray 13. Further, the third conveyance roller pair 6 is a conveyance roller pair that nips and conveys the two-ply sheet PJ in the sheet separating operation and functions as a displacement adjuster that can move in the width direction (the main scanning direction and the vertical direction to the drawing sheet of FIG. 1) while nipping the two-ply sheet PJ.

Details of the third conveyance roller pair 6 as a displacement adjuster are described below with reference to FIG. 14B.

Each of the first sensor 41, the second sensor 42, the third sensor 43, the fourth sensor 44, and the fifth sensor 45 functions as a sheet sensor employing a reflective photosensor that optically detects whether the sheet is present at the position of each sensor. The first sensor 41 is disposed at a position near the portion downstream from the first conveyance roller pair 4 in the sheet conveyance direction. The second sensor 42 is disposed at the position near a portion downstream from the second feed roller 3 in the sheet conveyance direction. The third sensor 43 is disposed at the position between the second conveyance roller pair 5 and the winding roller 20 and near a portion downstream from the second conveyance roller pair 5 in the sheet conveyance direction. The fourth sensor 44 serving as a sheet detection sensor is disposed at the position near a portion downstream from the winding roller 20 and upstream from the third conveyance roller pair 6 in the sheet conveyance direction. The fifth sensor 45 is disposed at the position downstream from the third conveyance roller pair 6 in the sheet conveyance direction.

A displacement detector 47 is disposed near the third sensor 43. The displacement detector 47 detects the displacement amount in the width direction (i.e., the direction orthogonal to the drawing sheet of FIG. 1) of the two-ply sheet PJ or the inner sheet PM to be conveyed toward the sheet separation unit 19. The displacement amount in the width direction is also referred to as a "lateral registration". Details of the displacement detector 47 are described below with reference to, for example, FIG. 14A.

A description is given of the winding roller 20 with reference to FIGS. 2A, 2B, 3A, 3B, 6B, 6B', 6C, 6C', 6D, and 7A.

Figure 2A:
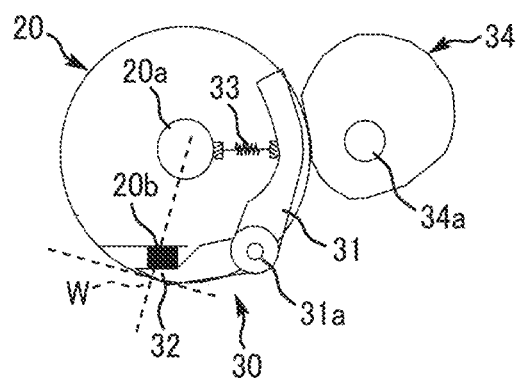
FIG. 2A is a side view of a gripper that has moved to a gripping position in the sheet separation device illustrated in FIG. 1.

FIG. 2A is a side view of a gripper 32 that has moved to a gripping position in the sheet separation device 1 illustrated in FIG. 1.

Figure 2B:
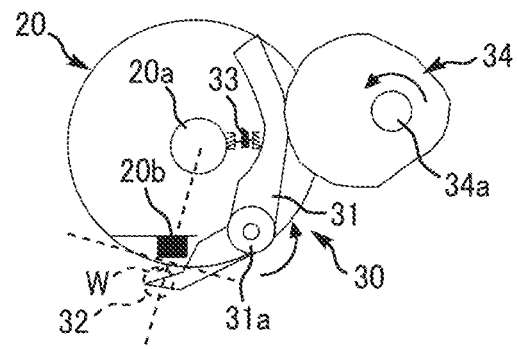
FIG. 2B is a side view of the gripper that has moved to a releasing position in the sheet separation device illustrated in FIG. 1.

FIG. 2B is a side view of the gripper 32 that has moved to a releasing position in the sheet separation device 1 illustrated in FIG. 1.

Figure 3A:
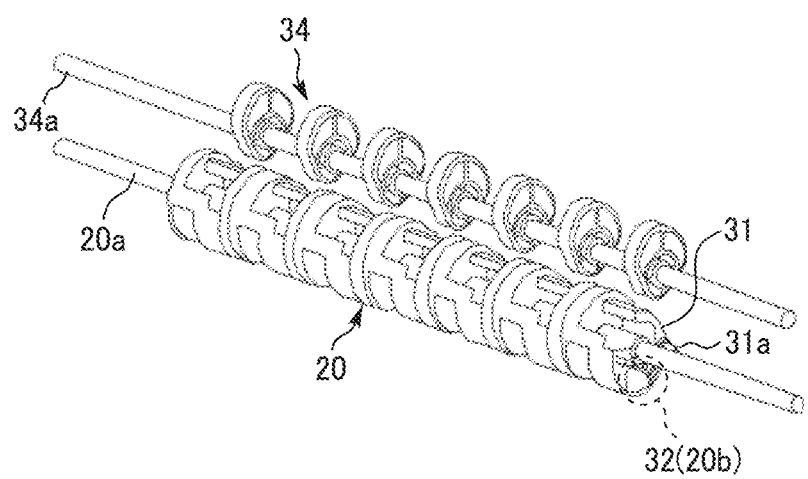
FIG. 3A is a perspective view of the gripper that has moved to the gripping position in the sheet separation device illustrated in FIG. 1

FIG. 3A is a perspective view of the gripper 32 that has moved to the gripping position in the sheet separation device 1 illustrated in FIG. 1.

Figure 3B:
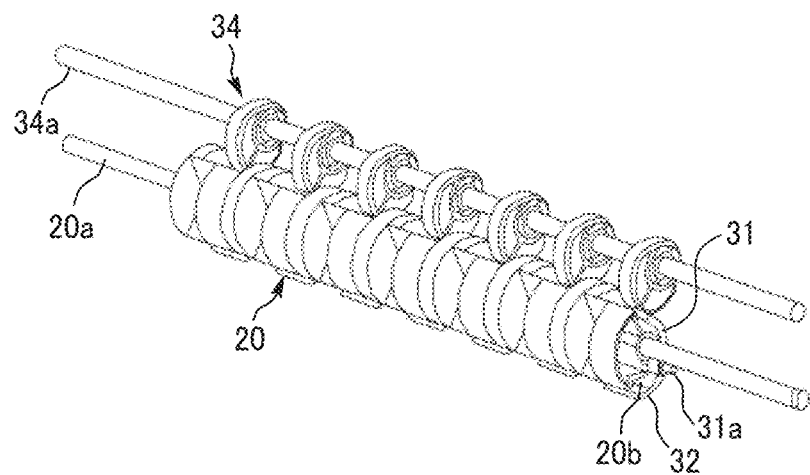
FIG. 3B is a perspective view of the gripper that has moved to the releasing position in the sheet separation device illustrated in FIG. 1.

FIG. 3B is a perspective view of the gripper 32 that has moved to the releasing position in the sheet separation device 1 illustrated in FIG. 1.

FIGS. 5A, 5B, 5C, and 5D are schematic views of the sheet separation device 1, each illustrating a sheet separating operation performed in the sheet separation device 1 illustrated in FIG. 1.

FIGS. 6A, 6B, 6B', 6C, 6C', and 6D are schematic views of the sheet separation device 1, each illustrating the sheet separating operation performed in the sheet separation device 1, subsequent from the sheet separating operation of FIGS. 5A, 5B, 5C, and 5D.

Figure 7A:
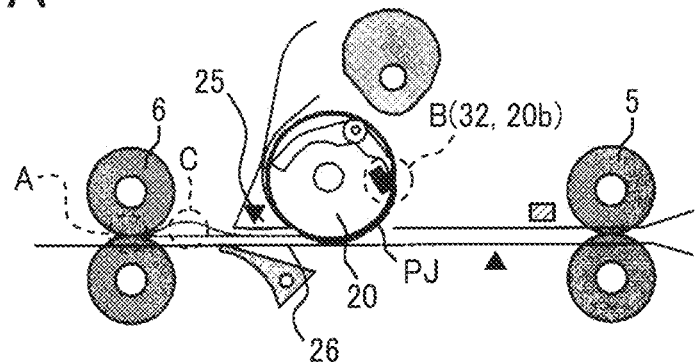
FIGS. 7A, 7B, and 7C are schematic views of the sheet separation device, each illustrating the sheet separating operation performed in the sheet separation device, subsequent from the sheet separating operation of FIGS. 6A, 6B, 6B', 6C, 6C', and 6D.
Figure 7B:
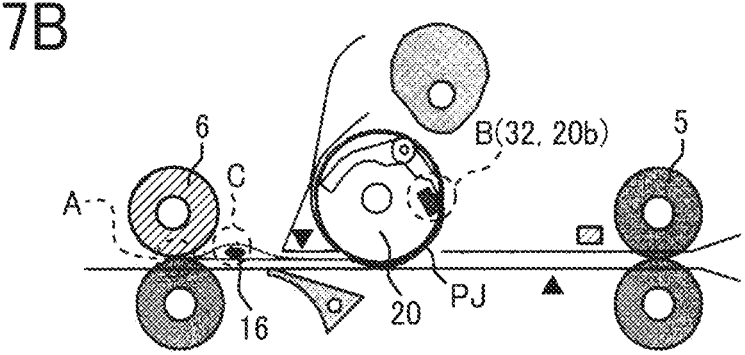
Figure 7C:
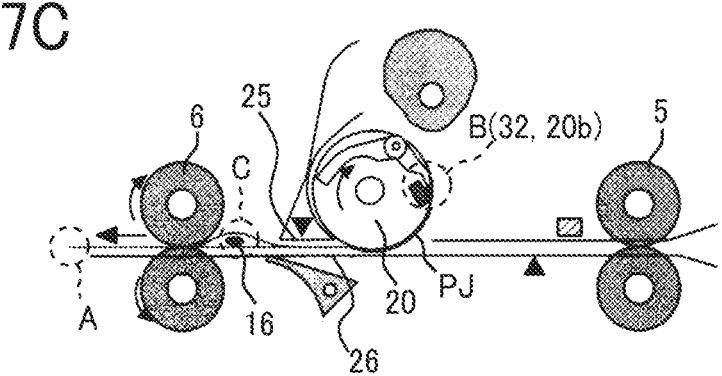

FIGS. 7A, 7B, and 7C are schematic views of the sheet separation device 1, each illustrating the sheet separating operation performed in the sheet separation device 1, subsequent from the sheet separating operation of FIGS. 6A, 6B, 6B', 6C, 6C', and 6D.

The winding roller 20 is a roller that rotates in a predetermined rotational direction to wind the two-ply sheet PJ around the winding roller 20 while the gripper 32 that functions as a handle gripping a gripped portion B of the two-ply sheet PJ at a winding start position W. The gripped portion B is an end of the two-ply sheet PJ that is the other end to the end at which the bonding portion A is formed, which is referred to as the other end of the two-ply sheet PJ. The winding roller 20 is rotatable around a rotary shaft 20*a* in the forward direction and in the reverse direction. The controller 500 controls a winding roller motor 201 (see FIG. 4) that drives the winding roller 20.

More specifically, as illustrated in FIG. 1, the two-ply sheet PJ starts from the first sheet tray 11 and passes through the first sheet conveyance passage K1, and the second conveyance roller pair 5 conveys the two-ply sheet PJ in the forward direction along the third sheet conveyance passage K3. The two-ply sheet PJ temporarily passes through the position of the winding roller 20, and then is conveyed to the position of the third conveyance roller pair 6.

Then, the third conveyance roller pair 6 as a conveyance roller pair rotates in the reverse direction to convey the two-ply sheet PJ in the reverse direction to the position of the winding roller 20, and the gripper 32 grips the other end (leading end) of the two-ply sheet PJ. The two-ply sheet PJ is further conveyed while the other end (leading end) of the two-ply sheet PJ is gripped by the gripper 32, and the winding roller 20 rotates in the counterclockwise direction in FIG. 1 to wind the two-ply sheet PJ around the winding roller 20.

With reference to FIG. 6C', as the winding roller 20 winds the two-ply sheet PJ, the linear velocity of the sheet P1 is proportional to the distance to the sheet P1 from the center of the winding roller 20 and the linear velocity of the sheet P2 is proportional to the distance to the sheet P2 from the center of the winding roller 20, so that the linear velocity of the surface of the winding roller 20 is proportional to the radius of the winding roller 20. Due to such a configuration, the sheet P1 is closer to the center of the winding roller 20 than the sheet P2, in other words, the sheet P1 is positioned at an inner side to the center of the winding roller 20 than the sheet P2, so that the linear velocity of the sheet P1 is lower than the linear velocity of the sheet P2.

As a result, the sheet P1 that is conveyed before the sheet P2 is more likely to slacken than the sheet P2. As illustrated in FIGS. 6D and 7A, a gap C is formed between the first sheet P1 and the second sheet P2 at the bonding portion A (the other end) of the two-ply sheet PJ, in other words, the gap C is formed as the first sheet P1 located upper than the second sheet P2 warps upward. As described above, the first sheet P1 and the second sheet P2 that are in close contact with each other without any gap are separated from each other.

A description is further given of a mechanism that generates the gap C in the two-ply sheet PJ between the winding roller 20 and the third conveyance roller pair 6 by winding the two-ply sheet PJ around the winding roller 20.

The two-ply sheet PJ wound around the winding roller 20 is gripped by the gripper 32, restricting misalignment in the sheet. Due to this configuration, a slip is generated between the first sheet P1 and the second sheet P2 by the amount of the circumferential length of the winding roller 20. Due to the slip, the conveyance amount of the inner sheet (i.e., the first sheet P1) is smaller than the conveyance amount of the outer sheet (i.e., the second sheet P2). As a result, slack is generated in the inner sheet (i.e., the first sheet P1) between the nip region of the third conveyance roller pair 6 and the winding roller 20.

At this time, as the two-ply sheet PJ is wound around the winding roller 20 by one or more rounds, the difference in the winding circumferential length is generated between the inner circumference and the outer circumference by the thickness of the sheet. As a result, the slack is additionally generated.

Finally, the slack is collected between the third conveyance roller pair 6 and the winding roller 20, and the gap C is formed between the two sheets P1 and P2.

More specifically, a distance from the rotary shaft 20*a* (i.e., the axial center) of the winding roller 20 to the second sheet P2 on the outer side of the winding roller 20 is R+ΔR, where a distance from the rotary shaft 20*a* (i.e., the axial center) of the winding roller 20 to the first sheet P1 on the inner side of the winding roller 20 is "R" and the thickness of the first sheet P1 on the inner side of the winding roller 20 is "ΔR". Since the radius of the first sheet P1 wound around the inner side of the winding roller 20 and the radius of the second sheet P2 wound around the outer side of the first sheet P1 are different by the thickness ΔR of the first sheet P1 (wound around the inner side of the winding roller 20), a circumferential length difference of 2×ΔR×π is generated between the inner sheet (first sheet P1) and the outer sheet (second sheet P2) when the two-ply sheet PJ is wound around the winding roller 20 by one round. As a result, where the number of winding the two-ply sheet PJ around the winding roller 20 is M times, the slack of the inner sheet (first sheet P1) is generated by the circumferential length difference of 2×ΔR×π×M.

Finally, the slack is accumulated between the third conveyance roller pair 6 and the winding roller 20, and the gap C corresponding to the circumferential length difference of 2×ΔR×π×M is formed between the first sheet P1 and the second sheet P2.

Particularly in the present embodiment, in order to significantly form the gap C as described above, the two-ply sheet PJ is wound around the winding roller 20 at least one round. As described above, in the present embodiment, by providing the winding roller 20 to wind the two-ply sheet PJ around the rotary shaft 20*a*, the two-ply sheet PJ can be separated without increasing the size and cost of the sheet separation device 1.

As illustrated in FIG. 6B', the gripper 32 illustrated in FIG. 2A in the present embodiment grips the gripped portion B of the two-ply sheet PJ without contacting the leading end face of the one end of the two-ply sheet PJ (the one end proximate to the gripped portion B). In the present disclosure, the "end face" of the two-ply sheet is defined as a side face extending in the thickness direction and connecting the front face and the back face of the two-ply sheet. Accordingly, there are four end faces of the rectangular two-ply sheet on the front, back, left, and right.

More specifically, the gripper 32 nips and grips the gripped portion B of the two-ply sheet PJ in a direction orthogonal to the sheet surface of the gripped portion B of the two-ply sheet PJ between the gripper 32 and a receiving portion 20*b* of the winding roller 20 without restricting the end face of the one end of the two-ply sheet PJ from hitting any member, in other words, without causing any member to contact the end face of the two-ply sheet PJ. The receiving portion 20*b* of the winding roller 20 is a part of the outer circumferential portion of the winding roller 20 and is arranged to face the gripper 32. More specifically, the receiving portion 20*b* is in a portion recessed inward from a virtual outer circumferential face of the winding roller 20. The virtual outer circumferential face is an outer circumferential face having a circular shape around which the two-ply sheet PJ is wound.

More specifically, the two-ply sheet PJ is not nipped and gripped by the gripper 32 and the receiving portion 20*b* of the winding roller 20 by being restricted while a specified member such as the gripper 32 contacts the end face of the one end (that is the leading end face). The two-ply sheet PJ is nipped and gripped by the gripper 32 and the receiving portion 20b while the end face of the one end (leading end face) does not contact any member.

Accordingly, the gripped portion B of the one end (leading end face) of the two-ply sheet PJ is gripped by the gripper 32 and the receiving portion 20b of the winding roller 20, and the end face (leading end face) of the one end of the two-ply sheet PJ does not contact an obtuse angle portion (wedge portion) of the gripper 32 in FIG. 6B'.

Without contacting any member, the end face (leading end) of the one end of the two-ply sheet PJ coincides with an end of a contact face of the receiving portion 20b at which the gripper 32 contacts the receiving portion 20b via the two-ply sheet PJ (the right end of the contact face in FIG. 6B').

The end face (leading end) of the one end of the two-ply sheet PJ may move to the right end of the contact face in FIG. 6B' avoiding the contact face between the gripper 32 and the receiving portion 20b so that the gripped portion B is inside the sheet from the leading end of the one end (the gripped portion B is in the portion proximate to the other end from the leading end of the one end). Alternatively, the end face (leading end face) of the one end of the two-ply sheet PJ may be within the contact face between the gripper 32 and the receiving portion 20b of the winding roller 20 in FIG. 6B'.

Accordingly, when compared with a configuration in which the leading end face of the two-ply sheet PJ contacts a member, the above-described structure according to the present embodiment can reduce damage on the two-ply sheet PJ (particularly, the leading end). In the present embodiment, the two-ply sheet PJ wound around the winding roller 20 has the bonding portion A at the one end of the two-ply sheet PJ and the gripped portion B at the other end of the two-ply sheet PJ.

In the present embodiment, at least the gripper 32 (handle) or the receiving portion 20b is made of elastic material such as rubber, spring, or leaf spring.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, when the gripper 32 and the receiving portion 20b included in the sheet separation device 1 are made of the elastic material, the sheet separation device 1 can easily achieve the above-described effect.

As illustrated in FIGS. 2A, 2B, 3A, and 3B, the moving mechanism 30 moves the gripper 32 at the winding start position W of the winding roller 20 between a gripping position (position illustrated in FIGS. 2A and 3A) at which the gripper 32 can grip the two-ply sheet PJ and a releasing position (position illustrated in FIGS. 2B and 3B) at which the gripper 32 is released from the gripping position.

Figure 4:
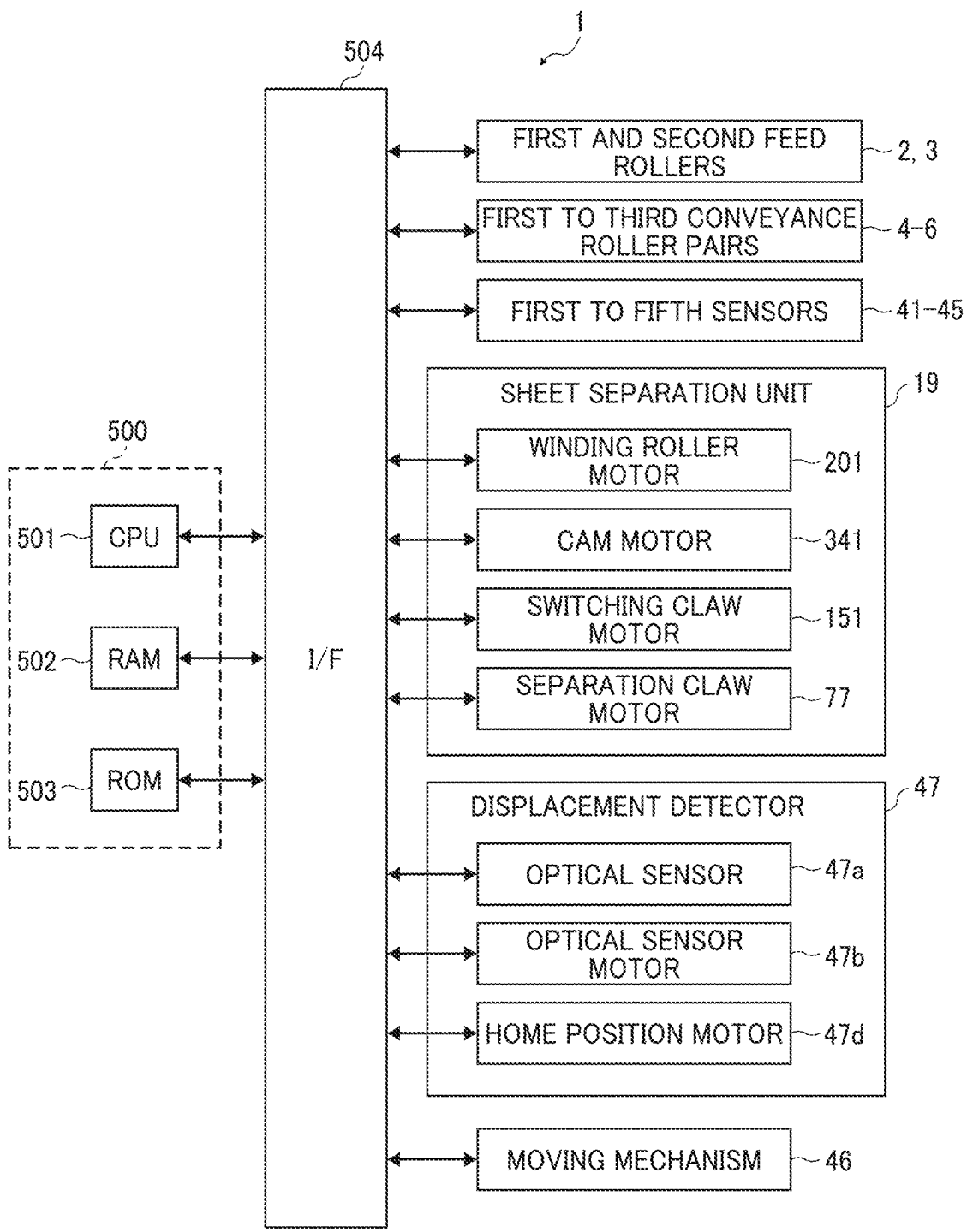
FIG. 4 is a block diagram illustrating a hardware configuration of the control block of the sheet separation device of FIG. 2 to control the operation of the sheet separation device.

More specifically, the moving mechanism 30 includes an arm 31, a compression spring 33, a cam 34, and a cam motor 341 (see FIG. 4). The compression spring 33 functions as a biasing member. The cam motor 341 drives to rotate the cam 34 in the forward direction or the reverse direction.

The arm 31 holds the gripper 32 and is held by the winding roller 20 to be rotatable together around a support shaft 31a. In the present embodiment, the gripper 32 is coupled to the base of the arm 31, in other words, the leading end of the arm 31, and the gripper 32 and the arm 31 are integrally made (held) as a single unit. Alternatively, the gripper 32 and the arm 31 may be made as separate members, and the gripper 32 may be mounted on the arm 31, that is, may be held by the arm 31. In any case, the arm 31 holding the gripper 32 rotates around the rotary shaft 20a together with the winding roller 20 with the gripper 32.

The compression spring 33 functions as a biasing member that biases the arm 31 so that the gripper 32 moves from the releasing position illustrated in FIG. 2B to the gripping position illustrated in FIG. 2A. More specifically, one end of the compression spring 33 is coupled to a fixed position near the rotary shaft 20a, and the other end of the compression spring 33 is coupled to one end of the arm 31 that is a free end that is in the opposite direction to the other end of the arm 31 coupled to the gripper 32 interposed by the support shaft 31a.

The cam 34 pushes the arm 31 against the biasing force of the compression spring 33 that functions as the biasing member, so that the gripper 32 moves from the gripping position illustrated in FIG. 2A to the releasing position illustrated in FIG. 2B. The cam motor 341 that is controlled by the controller 500 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the moving mechanism 30 including the above-described configuration, as illustrated in FIGS. 2A and 3A, when the cam 34 is not in contact with the arm 31, the arm 31 is biased by the compression spring 33 to press the gripper 32 against the receiving portion 20b. This state is referred to as a closed state.

By contrast, as illustrated in FIGS. 2B and 3B, when the cam 34 contacts and presses the arm 31, the arm 31 rotates in the counterclockwise direction in FIG. 2B around the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

When the gripper 32 is at the releasing position to be in the open state, the two-ply sheet PJ enters a space between the gripper 32 and the receiving portion 20b, and the gripper 32 moves to the gripping position to be in the closed state. As a result, the gripper 32 and the receiving portion 20b grip the two-ply sheet PJ.

In the present embodiment, as illustrated in FIGS. 3A and 3B, the winding roller 20 includes a plurality of roller portions (i.e., seven roller portions in the present embodiment) having a columnar shape and being disposed at given intervals in the axial direction of the winding roller 20. A plurality of grippers 32 and a plurality of arms 31 are disposed at divided positions between adjacent rollers, respectively. The divided positions are recesses between adjacent rollers. A plurality of cams 34 are disposed to be contactable to the plurality of arms 31, respectively.

The two-ply sheet PJ is not gripped at the position over the entire area of the winding roller 20 but is gripped at the divided positions at given intervals in the axial direction of the winding roller 20. By so doing, the load to grip the two-ply sheet PJ can be shared and scratch resistant at the leading end of the two-ply sheet PJ can be reduced. The above-described configuration is useful when a gripping force to grip the two-play sheet PJ increases, for example, when a large or heavy two-ply sheet PJ is gripped.

In the present embodiment, as illustrated in FIG. 1, the third sheet conveyance passage K3 is made of linear conveyance guide plates. By contrast, the third sheet conveyance passage K3 may be made of curved conveyance guide plates. In such a case, a gripping position at which the winding roller 20 grips the two-ply sheet PJ may be changed to be closer to the rotary shaft 20a than the gripping position in the present embodiment. Additionally, in such a case, the position of the gripper 32 according to the present embodiment and the position of the receiving portion 20b according to the present embodiment may be interchanged, so that the gripper 32 may be disposed closer to the rotary shaft 20a than the receiving portion 20b in the winding roller 20.

A description is given of the control system of the sheet separation device 1, with reference to FIG. 4.

FIG. 4 is a block diagram illustrating a hardware configuration of the control block of the sheet separation device 1 of FIG. 2 to control the operation of the sheet separation device 1.

As illustrated in FIG. 4, the sheet separation device 1 has the control system including a central processing unit (CPU) 501, a random access memory (RAM) 502, a read-only memory (ROM) 503, and an interface (I/F) 504. The CPU 501, the RAM 502, and the ROM 503 are connected via the I/F 504.

The CPU 501 is an arithmetic unit and controls the overall operation of the sheet separation device 1. The RAM 502 is a volatile storage medium that allows data to be read and written at high speed. The CPU 501 uses the RAM 502 as a work area for data processing. The ROM 503 is a read-only non-volatile storage medium that stores programs such as firmware.

The sheet separation device 1 processes, by an arithmetic function of the CPU 501, e.g., a control program stored in the ROM 503 and an information processing program (or application program) loaded into the RAM 502. Such processing configures a software controller including various functional modules of the sheet separation device 1. The software controller thus configured cooperates with hardware resources of the sheet separation device 1 construct functional blocks to implement functions of the sheet separation device 1. In other words, the CPU 501, the RAM 502, and the ROM 503 constitute the controller 500 to control the operation of the sheet separation device 1.

The I/F 504 is an interface that connects the first feed roller 2, the second feed roller 3, the first conveyance roller pair 4, the second conveyance roller pair 5, the third conveyance roller pair 6, the first sensor 41, the second sensor 42, the third sensor 43, the fourth sensor 44, the fifth sensor 45, the winding roller motor 201, the cam motor 341, a switching claw motor 151, a separation claw motor 77, an optical sensor 47a, an optical sensor motor 47b, a home position sensor 47d, and a moving mechanism 46, to the controller 500. The controller 500 causes respective drive units to drive the first feed roller 2, the second feed roller 3, the first conveyance roller pair 4, the second conveyance roller pair 5, the third conveyance roller pair 6, the winding roller motor 201, the cam motor 341, the switching claw motor 151, the separation claw motor 77, and the moving mechanism 46, via the I/F 504. The controller 500 acquires respective detection results from the first sensor 41, the second sensor 42, the third sensor 43, the fourth sensor 44, the fifth sensor 45, the optical sensor 47a, the optical sensor motor 47b, and the home position sensor 47d.

The winding roller motor 201 is a drive unit to drive the winding roller 20.

The cam motor 341 is a drive unit to drive the cam 34. The switching claw motor 151 is a drive unit to drive the switching claws 15.

Figure 5B:
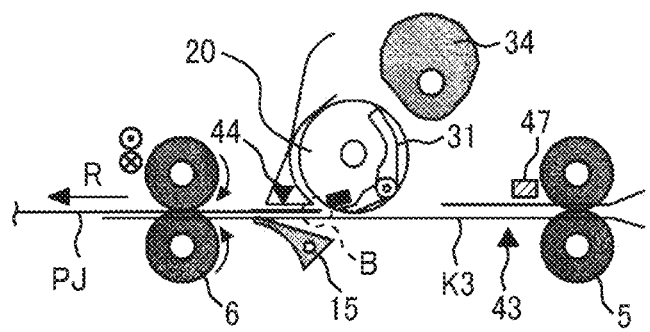
Figure 5C:
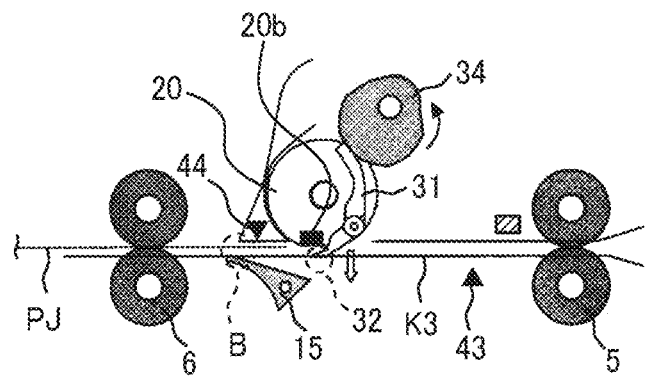
Figure 5D:
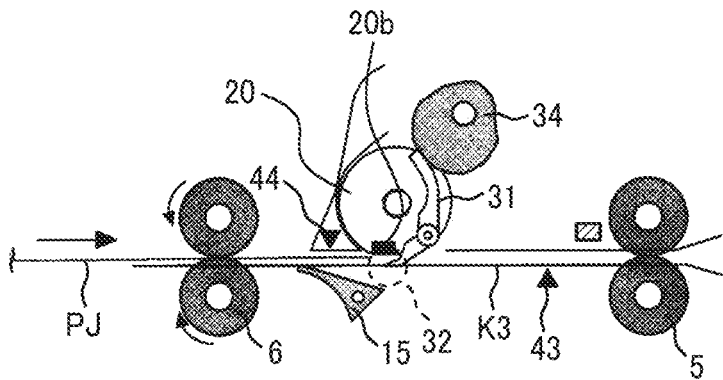

A description is given of the fourth sensor 44 provided for the sheet separation device 1 according to the present embodiment, with reference to FIGS. 1, 5D, and 6A. The fourth sensor 44 functions as a sheet detection sensor to detect the two-ply sheet PJ that is conveyed toward the winding roller 20. Based on the detection results of the fourth sensor 44 serving as a sheet detection sensor, the controller 500 controls the moving mechanism 30.

More specifically, the fourth sensor 44 is disposed on the conveyance guide in the sheet conveyance passage between the winding roller 20 and the third conveyance roller pair 6. As illustrated in FIGS. 5D and 6A, when the third conveyance roller pair 6 conveys the two-ply sheet PJ in the reverse direction toward the position of the winding roller 20 in the reverse direction, with the gripped portion B of the two-ply sheet PJ being the leading end, the fourth sensor 44 detects the leading end (i.e., the end of the gripped portion B) of the two-ply sheet PJ when the two-ply sheet PJ is conveyed in the reverse direction. In response to the detection timing at which the fourth sensor 44 detects the leading end (in the reverse direction) of the gripped portion B, the controller 500 adjusts and controls the timing to stop the two-ply sheet PJ at the gripping position and the timing at which the gripper 32 grips the gripped portion B. More specifically, after a given time has elapsed from the detection of the leading end of the two-ply sheet PJ by the fourth sensor 44, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveyance roller pair that conveys the two-ply sheet PJ with the one end (i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation claws 16 with reference to FIGS. 7A, 7B, 7C, 10, 11A, 11B, and 11C.

Figure 10:
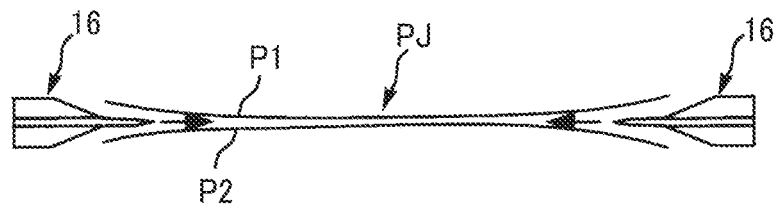
FIG. 10 is a schematic view of separation claws inserted into a two-ply sheet in a width direction of the two-ply sheet.

FIG. 10 is a schematic view of the separation claws 16 inserted into the two-ply sheet PJ in the width direction of the two-ply sheet PJ.

Figure 11A:
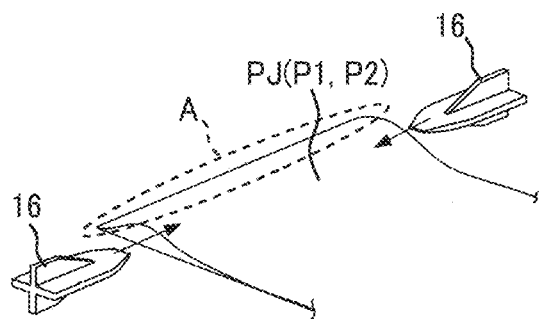
FIGS. 11A, 11B, and 11C are perspective views of the separation claws, each illustrating the operations of the separation claws in the width direction.
Figure 11B:
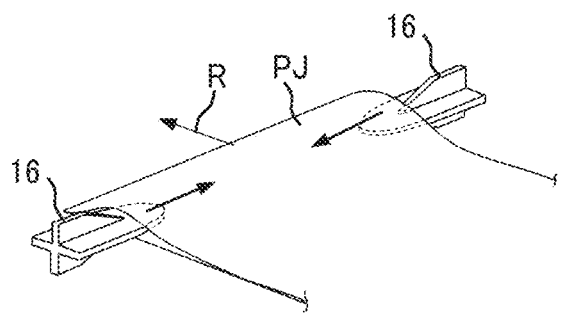
Figure 11C:
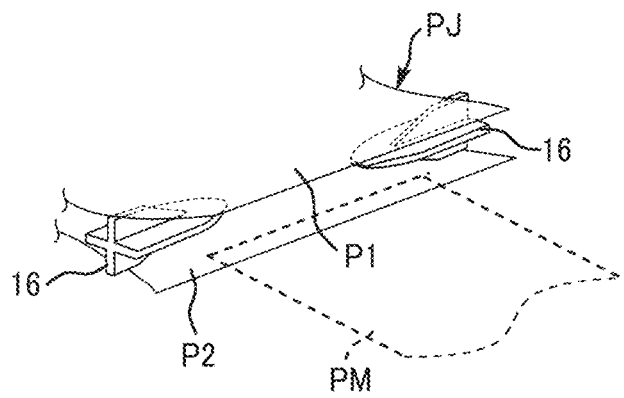

FIGS. 11A, 11B, and 11C are perspective views of the separation claws 16, each illustrating the operations of the separation claws 16 in the width direction of the two-ply sheet PJ. The separation claws 16 are inserted into the gap C formed between the first sheet P1 and the second sheet P2 at a position between the winding roller 20 and the third conveyance roller pair 6 from the outside of both ends of the two-ply sheet PJ in the width direction of the two-ply sheet PJ, with respect to the two-ply sheet PJ when the one end (that is the gripped portion B) is wound by the winding roller 20 and the other end (that is the bonding portion A) is nipped by the third conveyance roller pair 6 (sheet conveyance roller pair).

More specifically, in the present embodiment, the separation claws 16 are disposed at both ends of the two-ply sheet PJ in the width direction that is the direction perpendicular to a plane on which FIGS. 7A, 7B, and 7C are illustrated and the horizontal direction in FIG. 10. The separation claws 16 are separation plates, more specifically, the separation claws 16 have respective fins extending in the vertical direction from respective plates. In the direction in which the separation claws 16 are inserted into the two-ply sheet PJ, each of the respective plates has the rear end and the front end at the center in the width direction of the plates. The plate thickness and the plate width of each of the respective plates gradually increase from the front end to the rear end of the fin. The vertical length (length in the vertical direction) of the fin gradually increases from the front end of the fin in the direction in which the separation claw 16 is inserted into the two-ply sheet PJ. The fin and the plate in each of the separation claws 16 form a cross shape at the rear end of the fin (see FIG. 11A). Further, the separation claws 16 are movable in the width direction of the two-ply sheet PJ by a moving device controlled by the controller 500 so as not to contact with each other.

The separation claws 16 having the above-described configuration stand by at respective standby positions (see FIG. 11A) at which the separation claws 16 do not interfere with conveyance of the sheet such as the two-ply sheet PJ in the third sheet conveyance passage K3 until the gap C is formed between the two sheets (the first sheet P1 and the second sheet P2) as illustrated in FIG. 7A. Subsequently, as illustrated in FIGS. 10 and 11B, the separation claws 16 enter the gap C in the two-ply sheet PJ when separating the two-ply sheet PJ (including the first sheet P1 and the second sheet P2). As a result, the separation claws 16 give the gap C to be relatively large.

The moving device that moves the separation claws 16 in the width direction of the two-ply sheet PJ may employ, for example, a rack and pinion mechanism.

Figure 12A:
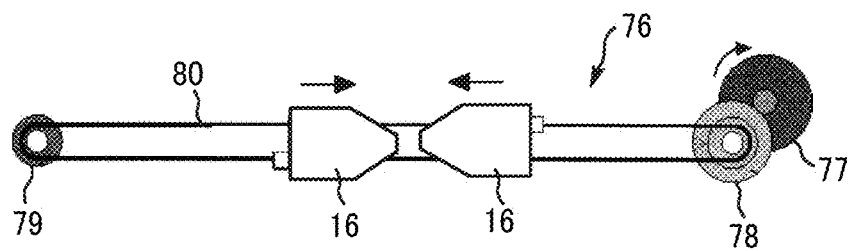
FIGS. 12A and 12B are schematic view of a driving mechanism to move the separation claws.
Figure 12B:
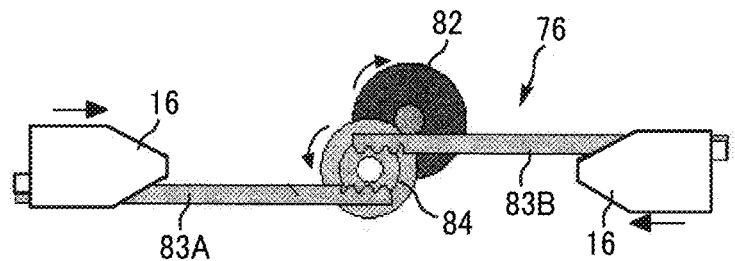

More specifically, the moving device that moves the pair of separation claws 16 in the width direction may employ a driving mechanism 76 as illustrated in FIG. 12A or FIG. 12B. FIGS. 12A and 12B are schematic view of the driving mechanism 76 to move the separation claws 16.

In the present embodiment, the two separation claws 16 are disposed facing each other, as illustrated in FIGS. 12A and 12B. The driving mechanism 76 illustrated in FIG. 12A moves the two separation claws 16 by a belt driving. On the other hand, the driving mechanism 76 illustrated in FIG. 12B moves the two separation claws 16 by a rack and pinion driving.

More specifically, the driving mechanism 76 illustrated in FIG. 12A includes a belt 80 stretched between a drive pulley 78 and a driven pulley 79 and the two separation claws 16 are attached to the belt 80 while facing each other. Of the two separation claws 16, one separation claw 16 is attached and connected to the lower part of the belt 80 and the other separation claw 16 is attached and connected to the upper part of the belt 80. The drive pulley 78 includes a drive gear that meshes with a motor gear mounted on the motor shaft of the separation claw motor 77. The rotational output of the separation claw motor 77 is transmitted to the belt 80. More specifically, as the motor gear of the separation claw motor 77 rotates in the clockwise direction in FIG. 12A, the two separation claws 16 approach toward each other. On the other hand, as the motor gear of the separation claw motor 77 rotates in the counterclockwise direction in FIG. 12A, the two separation claws 16 move away from each other.

The driving mechanism 76 illustrated in FIG. 12B includes two racks 83A and 83B extending in opposite directions from each other. Each of the racks 83A and 83B meshes with a single pinion 84. One separation claw 16 that is attached to the rack 83A faces the other separation claw 16 that is attached to the rack 83B. The pinion 84 includes a drive gear that meshes with a motor gear mounted on the motor shaft of a drive motor 82. The rotational output of the drive motor 82 is transmitted to the racks 83A and 83B. More specifically, as the motor gear of the drive motor 82 rotates in the clockwise direction in FIG. 12B, the two separation claws 16 approach toward each other. On the other hand, as the motor gear of the separation claw motor 77 rotates in the counterclockwise direction in FIG. 12B, the two separation claws 16 move away from each other.

As described above, each of the separation claws 16 of the present embodiment has the above-described shape having the plate and the fin extending in the vertical direction and is movable in the width direction of the two-ply sheet PJ due to the driving by the driving mechanism 76. Due to such a configuration, the separation claws 16 are smoothly inserted into the gap C generated in the two-ply sheet PJ as illustrated in FIG. 11B.

Figure 8A:
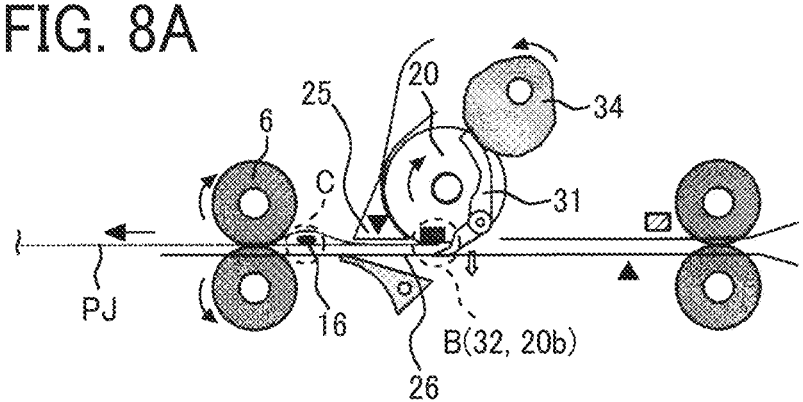
FIGS. 8A, 8B, and 8C are schematic views of the sheet separation device, each illustrating the sheet separating operation performed in the sheet separation device, subsequent from the sheet separating operation of FIGS. 7A, 7B, and 7C.
Figure 8B:
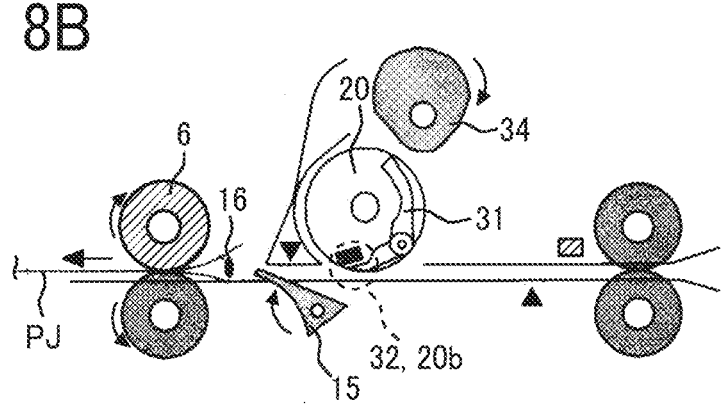
Figure 8C:
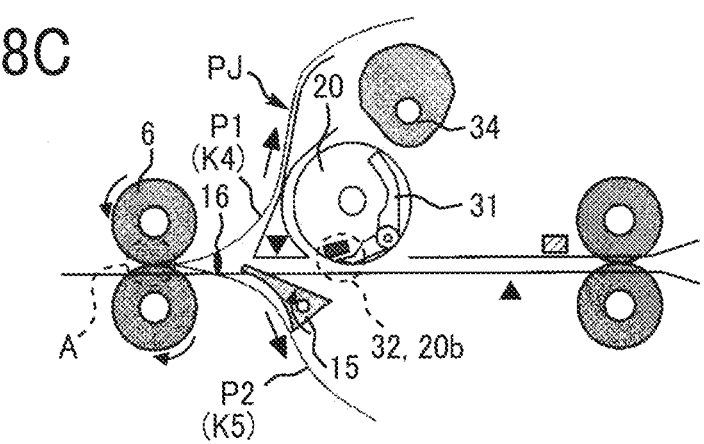

A description is given of the switching claws 15, with reference to FIGS. 8A, 8B, and 8C. FIGS. 8A, 8B, and 8C are schematic views of the sheet separation device 1, each illustrating the sheet separating operation performed in the sheet separation device 1, subsequent from the sheet separating operation of FIGS. 7A, 7B, and 7C.

Figure 9A:
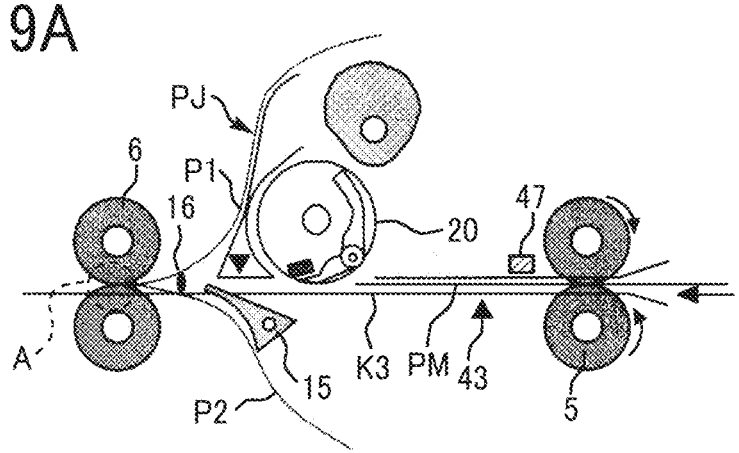
FIGS. 9A, 9B, and 9C are schematic views of the sheet separation device, each illustrating the sheet separating operation performed in the sheet separation device, subsequent from the sheet separating operation of FIGS. 8A, 8B, and 8C.
Figure 9B:
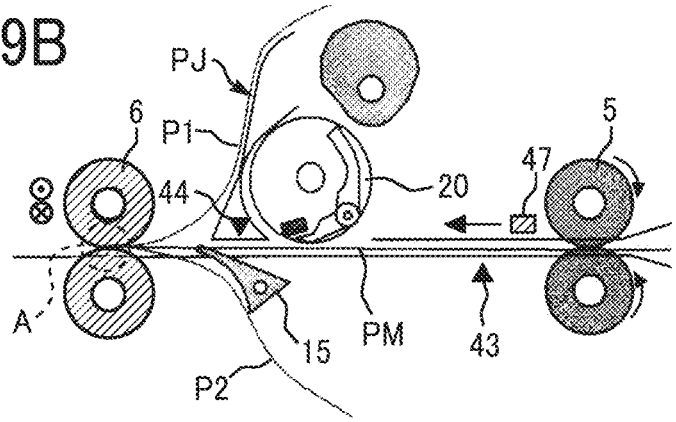
Figure 9C:
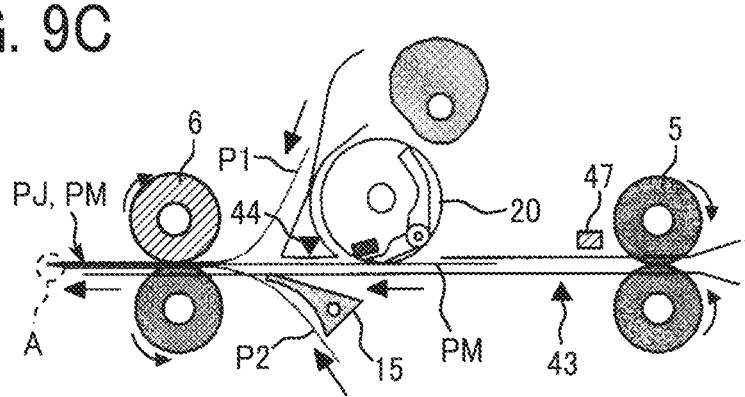

FIGS. 9A, 9B, and 9C are schematic views of the sheet separation device 1, each illustrating the sheet separating operation performed in the sheet separation device 1, subsequent from the sheet separating operation of FIGS. 8A, 8B, and 8C.

As illustrated in FIGS. 8A, 8B, and 8C, the switching claws 15 are switching plates disposed between the separation claws 16 and the winding roller 20. Note that the switching claws 15 may also be referred to in a singular form as "switching claw 15" for convenience. The two-ply sheet PJ is separated into the two sheets, which are the first sheet P1 and the second sheet P2, by the separation claws 16, and the two sheets P1 and P2 of the two-ply sheet PJ having stiffness are guided to respective directions different from each other, specifically, to the first branched sheet conveyance passage K4 and the second branched sheet conveyance passage K5, respectively. The first branched sheet conveyance passage K4 and the second branched sheet conveyance passage K5 are branched from the third sheet conveyance passage K3 (sheet conveyance passage) interposed by the third sheet conveyance passage K3. The switching claw 15 is a claw-shaped moving member to rotate in forward or in reverse within a range of a predetermined angle to guide the two-ply sheet PJ.

More specifically, in the present embodiment, the switching claws 15 are spaced apart from each other in the width direction of the two-ply sheet PJ, in other words, in the direction perpendicular to a plane of the drawing sheets on which FIGS. 8A, 8B, and 8C are illustrated. Further, the switching claws 15 are rotatable around the support shaft by the switching claw motor 151 (see FIG. 4) that is controlled by the controller 500.

The switching claws 15 having the above-described configuration stand by at respective standby positions (see FIG. 8A) at which the switching claws 15 do not interfere with conveyance of the sheet such as the two-ply sheet PJ in the third sheet conveyance passage K3 until the first sheet P1 and the second sheet P2 of the two-ply sheet PJ separated by the separation claws 16 are guided to the first branched sheet conveyance passage K4 and the second branched sheet conveyance passage K5, respectively. When the switching claws 15 guide the two sheets P1 and P2 separated from the two-ply sheet PJ by the separation claws 16 to the first branched sheet conveyance passage K4 and the second branched sheet conveyance passage K5, respectively, in other words, in the directions different from each other, the switching claws 15 rotate to the positions at which the switching claws 15 prevent the two-ply sheet PJ from entering the third sheet conveyance passage K3 when viewed from the two-ply sheet PJ as illustrated in FIG. 8B.

As a result, the first sheet P1 is guided to the first branched sheet conveyance passage K4, and the second sheet P2 is guided to the second branched sheet conveyance passage K5.

More specifically, as illustrated in FIG. 8A, after the separation claws 16 are inserted into the gap C, the third conveyance roller pair 6 conveys the two-ply sheet PJ to the other end (left side) so that the winding of the one end of the two-ply sheet PJ on the winding roller 20 is released. In other words, the controller 500 causes the third conveyance roller pair 6 to convey the two-ply sheet PJ toward the other end of the two-ply sheet PJ (i.e., the left side in FIG. 8A).

After the two-ply sheet PJ has been conveyed as illustrated in FIG. 8B, the third conveyance roller pair 6 conveys the two-ply sheet PJ to the one end (right side) again as illustrated in FIG. 8C. Then, the sheet P1 that is one of the two sheets of the two-ply sheet PJ separated by the separation claws 16 is guided to the first branched sheet conveyance passage K4, and the sheet P2 that is the other of the two sheets of the two-ply sheet PJ is guided to the second branched sheet conveyance passage K5. Subsequently, as illustrated in FIGS. 9A, 9B, and 9C, the second conveyance roller pair 5 conveys the inner sheet PM to the other end of the third sheet conveyance passage K3 to insert the inner sheet PM between the first sheet P1 and the second sheet P2 separated from the two-ply sheet PJ.

Referring to FIG. 7A, the first guide 25 is included in the sheet separation device 1 according to the present embodiment. The first guide 25 is disposed between the separation claws 16 (see FIG. 7B) and the winding roller 20 in the third sheet conveyance passage K3. The first guide 25 functions as an inner restraint to limit an amount of slack of the first sheet P1 that is wound around the winding roller 20 on the inner side, among the first sheet P1 and the second sheet P2 of the two-ply sheet PJ wound around the winding roller 20.

Further, referring to FIG. 7A, the second guide 26 is included in the sheet separation device 1 according to the present embodiment. The second guide 26 is disposed between the separation claws 16 (see FIG. 7B) and the winding roller 20 in the third sheet conveyance passage K3. The second guide 26 functions as an outer restraint to limit an amount of slack of the second sheet P2 that is wound around the winding roller 20 on the outer side, among the first sheet P1 and the second sheet P2 of the two-ply sheet PJ wound around the winding roller 20, when the second sheet P2 is slackened due to rotational unevenness of the winding roller 20 or the third conveyance roller pair 6.

A description is given of the operations performed in the sheet separation device 1 (sheet separation unit 19) to separate the two-ply sheet PJ, with reference to FIGS. 5 to 9C. Further, in the description of the operations, the operations of the separation claws 16 are appropriately described with reference to FIGS. 10, 11A, 11B, and 11C, and the control flow is described with reference to a flowchart of FIG. 13, that is, FIGS. 13A and 13B.

Figures 13, 13A, 13B:
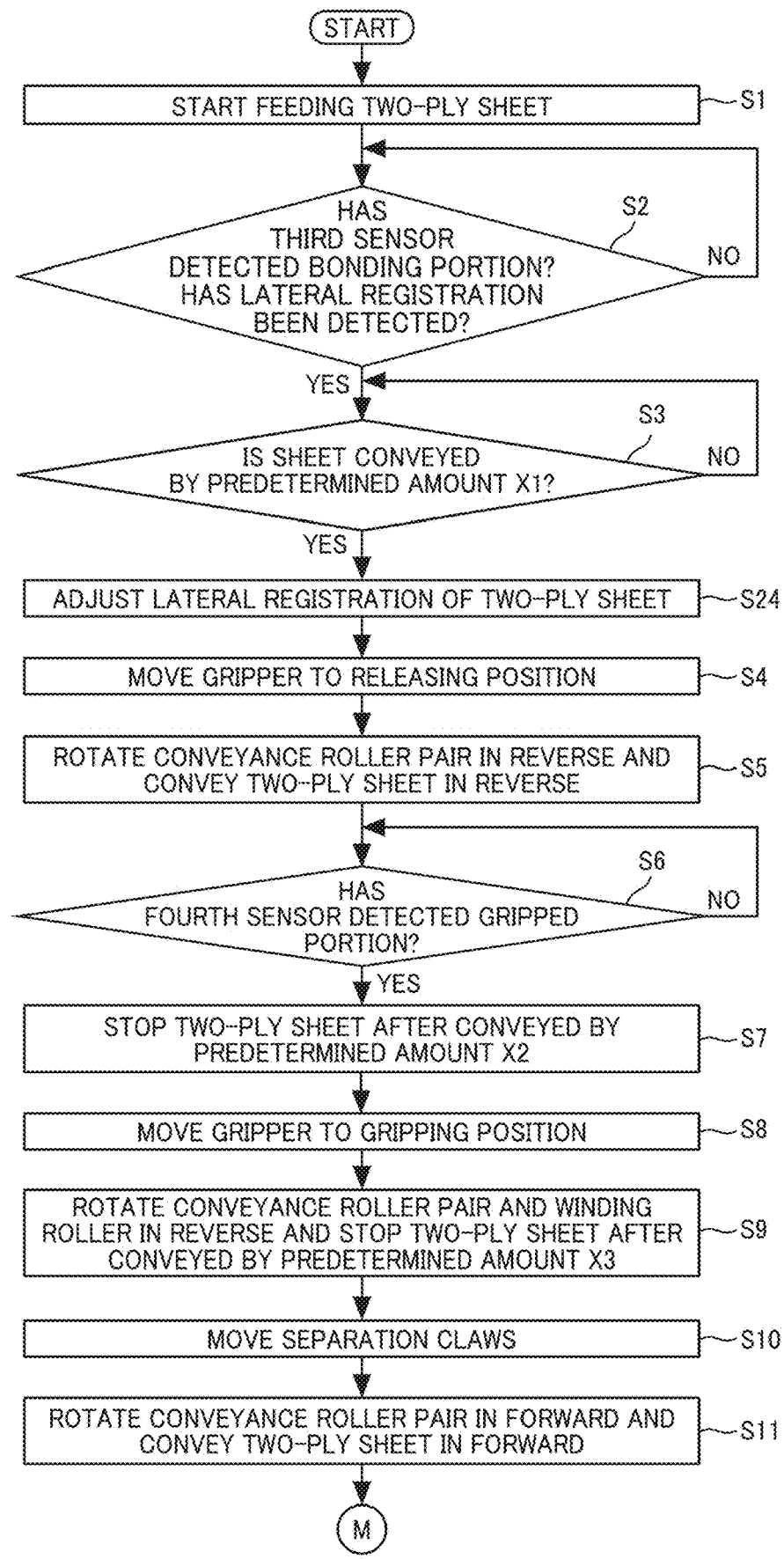
FIG. 13 including
FIGS. 13A and 13B is a flowchart illustrating the control process executed in the sheet separation device.
Figure 13B:
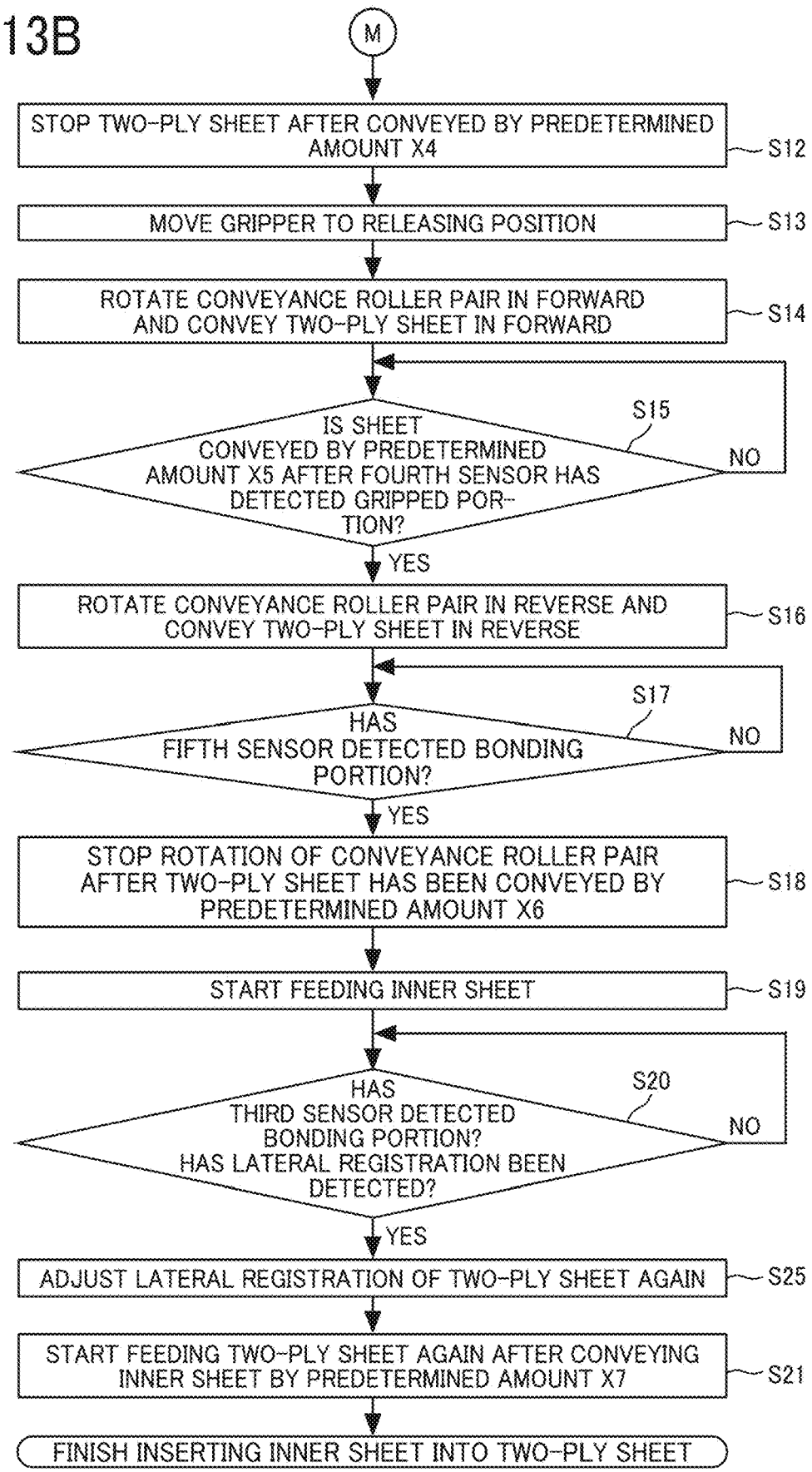

FIG. 13 including FIGS. 13A and 13B is a flowchart of the control process executed in the sheet separation device 1.

First, the first feed roller 2 and the first conveyance roller pair 4 start feeding the two-ply sheet PJ from the first sheet tray 11 (step S1 of the flowchart in FIG. 13A). Then, as illustrated in FIG. 5A, the second conveyance roller pair 5 conveys the two-ply sheet PJ with the bonding portion A as the leading end of the two-ply sheet PJ in the forward direction in the third sheet conveyance passage K3. The forward direction is a direction indicated by arrow R in FIGS. 5A and 5B. At this time, the displacement detector 47 detects the lateral registration (i.e., the displacement amount in the width direction) of the two-ply sheet PJ while the second conveyance roller pair 5 is nipping and conveying the two-two-ply sheet PJ (step S2 of the flowchart in FIG. 13A).

At this time, the controller 500 causes the moving mechanism 30 to locate the gripper 32 at the gripping position that is inside of the outer circumference of the winding roller 20. In other words, the cam 34 rotates to move to a position at which the cam 34 does not press the arm 31. When the gripper 32 is located at the gripping position as described above, the gripper 32 does not interrupt conveyance of the sheet in the third sheet conveyance passage K3.

The switching claws 15 rotate the free end downward and stand by at the standby positions at which the switching claws 15 do not interrupt the conveyance of the sheet in the third sheet conveyance passage K3.

Then, as illustrated in FIG. 5B, the third conveyance roller pair 6 conveys the two-ply sheet PJ until the gripped portion B of the two-ply sheet PJ (i.e., the trailing end of the two-ply sheet PJ conveyed in the forward direction, in other words, the one end of the two-ply sheet PJ) passes through the position of the winding roller 20. After the two-ply sheet PJ is further conveyed in the forward direction, the third conveyance roller pair 6 stops the conveyance of the two-ply sheet PJ, as illustrated in FIG. 5C. Specifically, the controller 500 determines whether the third sensor 43 detects the bonding portion A of the two-ply sheet PJ (i.e., the leading end of the two-ply sheet PJ conveyed in the forward direction, that is, the other end of the two-ply sheet PJ) in step S2 of the flowchart in FIG. 13A. When the third sensor 43 has not detected the bonding portion A of the two-ply sheet PJ (NO in step S2 of FIG. 13A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 13A), in response to the timing of detection of the bonding portion A of the two-ply sheet PJ by the third sensor 43, the controller 500 causes the third conveyance roller pair 6 to convey the two-ply sheet PJ in the forward direction by a predetermined amount X1, in step S3 of the flowchart in FIG. 13A, and stops the conveyance of the two-ply sheet PJ.

At this time, the displacement detector 47 detects the lateral registration error (i.e., the displacement amount in the width direction) of the two-ply sheet PJ. Then, the third conveyance roller pair 6 serving as a displacement adjuster moves in the width direction while the third conveyance roller pair 6 is nipping and conveying the two-two-ply sheet PJ, so that the lateral registration (i.e., the displacement amount in the width direction) becomes zero (step S24 of the flowchart in FIG. 13A). The timing to adjust the lateral registration of the two-ply sheet PJ by the third conveyance roller pair 6 serving as a displacement adjuster is not limited to the above-described timing.

Then, as illustrated in FIG. 5C, in response to the temporary stop of the conveyance of the two-ply sheet PJ by the third conveyance roller pair 6, the controller 500 causes the gripper 32 to move from the gripping position to the releasing position, in step S4 of the flowchart in FIG. 13A. In other words, the controller 500 causes the cam 34 to rotate to the position at which the cam 34 presses the arm 31. While the cam 34 presses the arm 31, the gripped portion B of the two-ply sheet PJ can be received between the gripper 32 and the receiving portion 20*b* of the winding roller 20.

Then, as illustrated in FIG. 5D, the controller 500 causes the third conveyance roller pair 6 to rotate in the reverse direction to start conveyance of the two-ply sheet PJ in the reverse direction in step S5 of the flowchart in FIG. 13A. At this time, the fourth sensor 44 detects the gripped portion B of the two-ply sheet PJ (i.e., the one end of the two-ply sheet PJ, in other words, the leading end of the two-ply sheet PJ conveyed in the reverse direction) to convey the gripped portion B of the two-ply sheet PJ to the gripping position of the winding roller 20.

Subsequently, the controller 500 determines whether the fourth sensor 44 has detected the gripped portion B of the two-ply sheet PJ, in step S6 of the flowchart in FIG. 13A. When the fourth sensor 44 has not detected the gripped portion B (NO in step S6 of FIG. 13A), step S6 is repeated until the fourth sensor 44 detects the gripped portion B of the two-ply sheet PJ. By contrast, when the fourth sensor 44 has detected the gripped portion B (YES in step S6 of FIG. 13A), as illustrated in FIG. 6A, in response to the detection of the gripped portion B of the two-ply sheet PJ by the fourth sensor 44, the controller 500 causes the third conveyance roller pair 6 to convey the two-ply sheet PJ by a predetermined amount X2 until the gripped portion B of the two-ply sheet PJ reaches the predetermined rotational position of the winding roller 20, in other words, the winding start position W (see FIG. 2). Then, the controller 500 causes the third conveyance roller pair 6 to stop the conveyance of the two-ply sheet PJ, in step S7 of the flowchart in FIG. 13A.

Then, as illustrated in FIG. 6B, the gripper 32 is moved from the releasing position to the gripping position while the gripped portion B of the two-ply sheet PJ is at the predetermined rotational position of the winding roller 20 (i.e., the winding start position W), in step S8 of the flowchart in FIG. 13A. In other words, the controller 500 causes the cam 34 to rotate to the position at which the cam 34 does not press the arm 31. While the cam 34 is at the position, as illustrated in FIG. 6B', the end face of the one end of the two-ply sheet PJ does not contact any member, and the gripped portion B of the two-ply sheet PJ is gripped between the gripper 32 and the receiving portion 20*b* of the winding roller 20. The winding start position W illustrated in FIG. 2 is the predetermined position of the outer circumferential face of the winding roller 20 at the predetermined rotational position of the winding roller 20. However, at the releasing position in FIG. 6A and the gripping position in FIG. 6B, the outer circumferential face of the winding roller 20 does not exist. For this reason, the winding start position W is a position on a theoretical outer circumferential face of the winding roller 20.

Then, as illustrated in FIG. 6C, the winding roller 20 rotates in the reverse direction (that is, the counterclockwise direction in FIG. 6C) while the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 6D. As the gap C is formed, the first guide 25 and the second guide 26 limit the warp (slack) of the two-ply sheet PJ near the winding roller 20. As a result, the gap C of the two-ply sheet PJ is intensively formed near the third conveyance roller pair 6.

As described above, the leading end of the two-ply sheet PJ in the reverse direction is detected by the fourth sensor 44 that is disposed between the third conveyance roller pair 6 and the winding roller 20 and downstream from the third conveyance roller pair 6 in the reverse direction. Since the controller 500 determines the timing at which the gripper 32 and the receiving portion 20*b* grip the gripped portion B of the two-ply sheet PJ in response to the timing of detection of the leading end of the two-ply sheet PJ conveyed in the reverse direction by the fourth sensor 44, the gripped portion B of the two-ply sheet PJ can be accurately conveyed to a desired gripping position regardless of variations in the sheet lengths with respect to the sheet conveyance amount X2 as the predetermined amount X2. Note that the size of sheets includes an error even if the sheets are sold as the same size.

Further, the fourth sensor 44 is disposed between the third conveyance roller pair 6 and the winding roller 20 at the position proximate to the winding roller 20. By so doing, the sheet conveyance amount X2 from the detection of the leading end of the two-ply sheet PJ in the reverse direction can be reduced regardless of the sheet length. As a result, the above-described configuration can reduce variation in the sheet conveyance amount X2 (i.e., the predetermined amount X2) and can accurately convey the gripped portion B of the two-ply sheet PJ to the desired gripping position.

Accordingly, the fourth sensor 44 is preferably disposed at the position near the winding roller 20.

Then, the controller 500 causes the third conveyance roller pair 6 to continue to rotate in the reverse direction and the winding roller 20 to start winding the two-ply sheet PJ, as illustrated in FIG. 6D. At the timing at which the third conveyance roller pair 6 has conveyed the two-ply sheet PJ by a conveyance amount that is equal to a predetermined amount X3 since the start of winding of the two-ply sheet PJ by the winding roller 20, the controller 500 causes the third conveyance roller pair 6 to stop the conveyance of the two-ply sheet PJ and the winding roller 20 to stop the winding the two-ply sheet PJ, as illustrated in FIG. 7A, in step S9 of FIG. 13A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened.

In other words, the bonding portion A of the two-ply sheet PJ is nipped by the third conveyance roller pair 6.

As a result, as illustrated in FIG. 7B, the controller 500 causes the separation claws 16 to move to be inserted into the gap C that is sufficiently widened in the two-ply sheet PJ, as illustrated in FIG. 7B, in step S10 of FIG. 13A. In other words, as illustrated in FIGS. 10 and 11A, each of the separation claws 16 in pair is moved from the standby position in FIG. 11A to the separation position in FIG. 11B. At this time, the third conveyance roller pair 6 functioning as a displacement adjuster has adjusted the lateral registration (i.e., the displacement amount in the width direction) of the two-ply sheet PJ to zero. Due to such a configuration, the separation claws 16 are smoothly inserted into the gap C of the two-ply sheet PJ (step S24 of the flowchart in FIG. 13A).

Then, as illustrated in FIG. 7C, the third conveyance roller pair 6 and the winding roller 20 start rotating in the forward direction, in other words, in the clockwise direction while the separation claws 16 are inserted in the gap C, in step S11 of FIG. 13A.

At this time, when the winding roller 20 can convey the two-ply sheet PJ along with rotation of the winding roller 20 in the forward direction (i.e., the clockwise direction), the bonding portion A of the two-ply sheet PJ may not be nipped by the third conveyance roller pair 6. In other words, as the winding roller 20 rotates in the forward direction, the bonding portion A of the two-ply sheet PJ may be conveyed toward the third conveyance roller pair 6. Then, the third conveyance roller pair 6 may convey the two-ply sheet PJ while nipping the bonding portion A of the two-ply sheet PJ.

Then, as illustrated in FIG. 8A, the controller 500 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 13B. At this time, the two-ply sheet PJ is not wound around the gripper 32 and the gripper 32 can release the gripping of the gripped portion B of the two-ply sheet PJ at the winding start position W. In other words, at the winding start position W, the gripper 32 can move from the gripping position at which the gripper 32 grips the gripped portion B of the two-ply sheet PJ to the releasing position.

Then, the gripper 32 is moved from the gripping position to the releasing position while the two-ply sheet PJ is not wound around the gripper 32, so that the gripper 32 is on the third sheet conveyance passage K3, in step S13 of FIG. 13B. In other words, the cam 34 rotates as illustrated in FIG. 2B to move to the position at which the cam 34 presses the arm 31. By so doing, the gripper 32 releases the gripping of the two-ply sheet PJ. In the present embodiment, the cam 34 in the moving mechanism 30 moves to release the gripping of the two-ply sheet PJ by the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the moving mechanism 30.

Then, as illustrated in FIG. 8B, the controller 500 causes the third conveyance roller pair 6 to rotate in the forward direction again to start conveyance of the two-ply sheet PJ in the forward direction, in step S14 of FIG. 13B. In response to the start of the conveyance of the two-ply sheet PJ in the forward direction, the fourth sensor 44 detects the gripped portion B of the two-ply sheet PJ, i.e., the one end of the two-ply sheet PJ and the trailing end of the two-ply sheet PJ conveyed in the forward direction. In addition, after the gripped portion B of the two-ply sheet PJ, i.e., the one end of the two-ply sheet PJ and the trailing end of the two-ply sheet PJ in the forward direction, passes over the switching claws 15, the gripper 32 is moved from the releasing position to the gripping position and the switching claws 15 are rotated in the clockwise direction from the standby position to the switching position. Then, as illustrated in FIG. 8B, when the gripped portion B of the two-ply sheet PJ, i.e., the trailing end of the two-ply sheet PJ conveyed in the forward direction reaches near the separation claws 16, the trailing ends of the first sheet P1 and the second sheet P2 of the two-ply sheet PJ are separated and largely opened.

Then, the controller 500 determines whether the third conveyance roller pair 6 conveys the two-ply sheet PJ by a predetermined amount X5 in response to the timing at which the fourth sensor 44 detects the trailing end of the two-ply sheet PJ conveyed in the forward direction, in other words, after the fourth sensor 44 has detected the gripped portion B of the two-ply sheet PJ, in step S15 of FIG. 13B. When the third conveyance roller pair 6 does not convey the two-ply sheet PJ by the predetermined amount X5 after the fourth sensor 44 has detected the gripped portion B of the two-ply sheet PJ (NO in step S15 of FIG. 13B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 13B), the controller 500 causes the third conveyance roller pair 6 to stop conveying the two-ply sheet PJ and causes the separation claws 16 to move in the reverse direction to start conveyance of the two-ply sheet PJ in the reverse direction, as illustrated in FIG. 8C, in step S16 of FIG. 13B. At this time, since the free ends of the switching claws 15 are located at the switching position where the entry of the two-ply sheet PJ into the third sheet conveyance passage K3 is blocked, the two sheets, in other words, the first sheet P1 and the second sheet P2 separated from each other are guided to the first branched sheet conveyance passage K4 and the second branched sheet conveyance passage K5, respectively, as illustrated in FIG. 8C. At this time, the fifth sensor 45 (see FIG. 1) detects the bonding portion A of the two-ply sheet PJ (i.e., the other end of the two-ply sheet PJ and the trailing end of the two-ply sheet PJ conveyed in the reverse direction) so as to convey and stop the two-ply sheet PJ while the third conveyance roller pair 6 nips the portion near the bonding portion A of the two-ply sheet PJ.

Subsequently, as illustrated in FIG. 9A, in response to the timing at which the fifth sensor 45 (see FIG. 1) detects the trailing end of the two-ply sheet PJ conveyed in the reverse direction, that is, the bonding portion A of the two-ply sheet PJ in step S17 of FIG. 13B. Then, the controller 500 causes the third conveyance roller pair 6 to convey the two-ply sheet PJ by a predetermined amount X6 and stop, in step S18 of FIG. 13B. At this time, the bonding portion A of the two-two-ply sheet PJ is at the nipping position of the third conveyance roller pair 6 or a position slightly left and downstream from the nip region in the forward direction. In other words, the other end of the two-ply sheet PJ is nipped by the third conveyance roller pair 6.

Then, as illustrated in FIG. 9A, the controller 500 starts to convey the inner sheet PM from the second sheet tray 12 (see FIG. 1), in step S19 of FIG. 13B. At this time, the third sensor 43 detects the leading end of the inner sheet PM (i.e., the other end of the inner sheet PM and the leading end in the forward direction). In addition, as illustrated in FIG. 9B, the separation claws 16 move to the respective standby positions.

Further, as illustrated in FIGS. 9A and 9B, the displacement detector 47 detects the lateral registration (i.e., the displacement amount in the width direction) of the inner sheet PM while the second conveyance roller pair 5 is nipping and conveying the inner sheet PM (step S20 of the flowchart in FIG. 13B). Then, the third conveyance roller pair 6 serving as a displacement adjuster moves in the width direction while nipping the two-ply sheet PJ so that the lateral registration (i.e., the displacement amount in the width direction) of the two-ply sheet PJ that is equal to the lateral registration (i.e., the displacement amount in the width direction) of the inner sheet PM detected by the displacement detector 47, as illustrated in FIG. 9B (step S25 of the flowchart in FIG. 13B).

Subsequently, as illustrated in FIG. 9C, in response to the timing at which the third sensor 43 detects the leading end of the inner sheet PM in the forward direction (step S20 in FIG. 13B), the controller 500 causes the second conveyance roller pair 5 to convey the inner sheet PM by the predetermined amount X7, and then the third conveyance roller pair 6 starts the conveyance of the two-ply sheet PJ in the forward direction again, in step S21 of FIG. 13B. At this time, the inner sheet PM is accurately nipped at a desired position between the first sheet P1 and the second sheet P2 of the two-ply sheet PJ.

Thus, the controller 500 finishes the operations to insert the inner sheet PM between the first sheet P1 and the second sheet P2 in the two-ply sheet PJ. The third conveyance roller pair 6 conveys the two-ply sheet PJ in the forward direction with the inner sheet PM being inserted in the two-ply sheet PJ, so that the two-ply sheet PJ with the inner sheet PM is placed on the ejection tray 13 (see FIG. 1).

In the state illustrated in FIG. 7A of the present embodiment, the gap C is formed between the first sheet P1 and the second sheet P2 of the two-ply sheet PJ in the non-bonding portion near the bonding portion A of the two-ply sheet PJ to peel (separate) the two sheets, i.e., the first sheet P1 and the second sheet P2.

By contrast, in the state illustrated in FIG. 7A of the present embodiment, the bonding portion A of the two-ply sheet PJ may be set as the gripped portion B if the two-ply sheet PJ is gripped by the third conveyance roller pair 6 with sufficiently strong force. In other words, in FIGS. 6A, 6B, 6B', 6C, 6C', and 6D, while the bonding portion A of the two-ply sheet PJ is gripped by the gripper 32 and the receiving portion 20b of the winding roller 20, the two-ply sheet PJ is wound around the winding roller 20, and the non-bonding portion is nipped and conveyed by the third conveyance roller pair 6. At this time, the third conveyance roller pair 6 rotates to convey the first sheet P1 and the second sheet P2 of the two-ply sheet PJ in synchrony with each other without slipping. For example, increasing the nip pressure of the third conveyance roller pair 6, using roller material having a large coefficient of friction, or controlling the driving method of the rollers of the third conveyance roller pair 6 reduces occurrence of slippage of the two sheets P1 and P2 (i.e., the first sheet P1 and the second sheet P2). By so doing, a desired gap such as the gap C is formed in the two-ply sheet PJ to peel (separate) the two sheets P1 and P2. The above-described configuration can also reduce the number of times of conveyance of the two-ply sheet PJ until the inner sheet PM is inserted into the two-ply sheet PJ.

As described above, with reference to FIGS. 1, 14A, and 14B, the sheet separation device 1 according to the present embodiment includes the displacement detector 47 and the third conveyance roller pair 6 serving as a displacement adjuster.

Then, the displacement detector 47 (serving as a displacement detector) and the third conveyance roller pair 6 (serving as a displacement adjuster) are used to set that the lateral registration (i.e., the displacement amount in the width direction) of the inner sheet PM with respect to the two-ply sheet PJ to be a desired value.

A detailed description is now given of the details of the above-described operation.

Figure 14A:
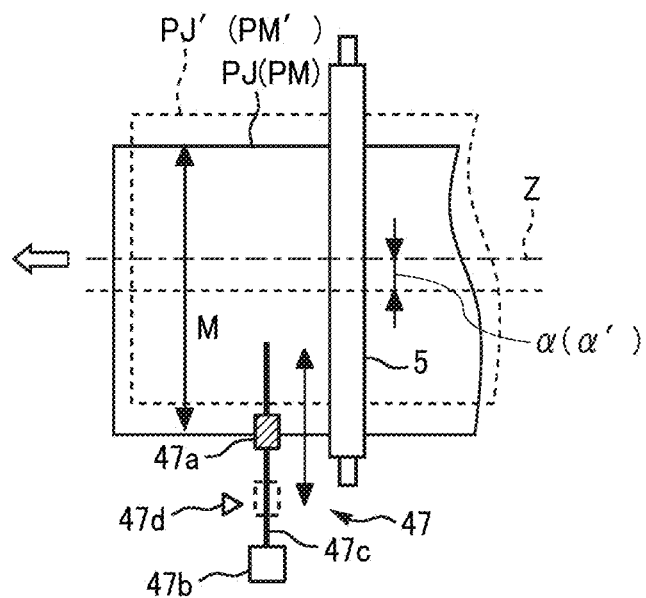
FIG. 14A is a top view of a displacement detector and the area around the displacement detector.

FIG. 14A is a top view of the displacement detector 47 and the area around the displacement detector 47.

Figure 14B:
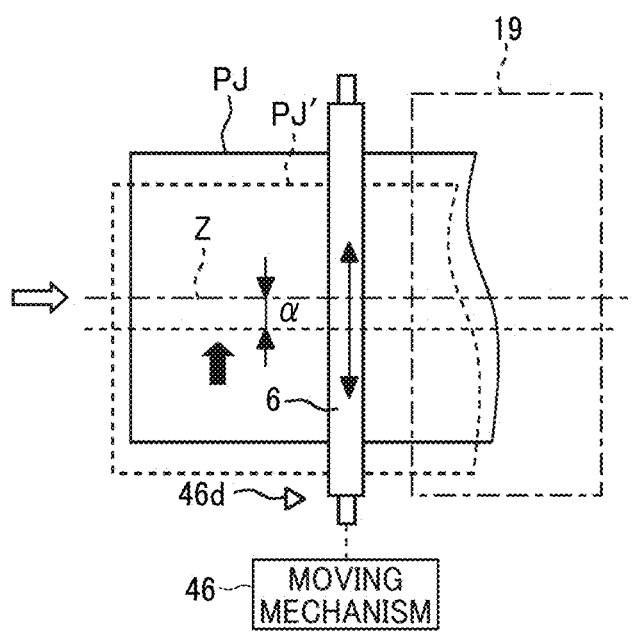
FIG. 14B is a top view of a displacement adjuster and the area around the displacement adjuster.

FIG. 14B is a top view of the third conveyance roller pair 6 serving as a displacement adjuster and the area around the third conveyance roller pair 6.

With reference to FIG. 14A, the displacement detector 47 detects the displacement in the width direction amount (i.e., the lateral registration) of the two-ply sheet PJ being conveyed in the predetermined sheet conveyance direction toward the sheet separation unit 19. The predetermined sheet conveyance direction is the direction indicted by white arrow in FIG. 14A. The width direction of the two-ply sheet PJ is the direction orthogonal to the sheet conveyance direction and the vertical direction in FIGS. 14A and 14B. The displacement detector 47 also detects the displacement amount in the width direction (i.e., the lateral registration) of the inner sheet PM being conveyed in the direction indicted by white arrow toward the sheet separation unit 19.

More specifically, the displacement detector 47 includes the optical sensor 47a, the optical sensor motor 47b, a feed screw 47c, a guide rod, and the home position sensor 47d.

The optical sensor 47a is a reflection type photosensor including a light emitting element and a light receiving element and is disposed upstream (i.e., the right side in FIG. 1) from the sheet separation unit 19 in the sheet conveyance direction (the sub-scanning direction). The optical sensor 47a is movable at one end (i.e., the lower end in FIG. 14A) within a widthwise range corresponding to a size M of the two-ply sheet PJ or the inner sheet PM in the width direction. Specifically, the optical sensor 47a has an internal thread and a through hole and is held to be movable in the width direction. The feed screw 47c extending in the width direction screws together with the internal thread. The guide rod disposed parallel to the feed screw 47c is inserted through the through hole. When the optical sensor motor 47b that is a forward and reverse rotation type is driven, the feed screw 47c is rotated in the forward and reverse directions. By so doing, the optical sensor 47a can be moved within a range indicated by a bidirectional arrow in FIG. 14A.

The position of the edge portion at the one end of the two-ply sheet PJ that is nipped and conveyed by the second conveyance roller pair 5 is optically detected by the optical sensor 47a. Specifically, when the third sensor 43 (see FIG. 1) detects the two-ply sheet PJ, the optical sensor 47a that stays at the home position (indicated with a broken line in FIG. 14A) moves in the width direction to the position at which the optical sensor 47a detects the edge portion at the one end of the two-ply sheet PJ. The home position of the optical sensor 47a is detected by the home position sensor 47d. Then, the displacement amount α of the two-ply sheet PJ in the width direction (i.e., the lateral registration) from the center reference Z (i.e., the desired position as the widthwise center position of a sheet of any size in the width direction) is obtained, based on the distance of movement from the home position of the optical sensor 47a (obtained from the number of steps of the optical sensor motor 47b) or the size M of the two-ply sheet PJ in the width direction.

Like the conveyance of the two-ply sheet PJ, when the inner sheet PM is conveyed, a displacement amount α' of the inner sheet PM in the width direction (i.e., the lateral registration) is detected by the displacement detector 47.

Normally, the widthwise and lengthwise size of the two-ply sheet PJ is larger than the widthwise and lengthwise size of the inner sheet PM.

The size M of the two-ply sheet PJ and the inner sheet PM in the width direction can be grasped based on the information of the two-ply sheet PJ and the inner sheet PM input to the operation display panel 49.

On the other hand, with reference to FIG. 14B, the third conveyance roller pair 6 functions as a displacement adjuster that can adjust the displacement amount of the two-ply sheet PJ in the width direction, in other words, the displacement amount in the width direction of the two-ply sheet PJ (i.e., the lateral registration) before the sheet separating operation, based on the displacement amount in the width direction (i.e., the lateral registration) of the two-ply sheet PJ detected by the displacement detector 47 (serving as a displacement detector).

Further, the third conveyance roller pair 6 serving as a displacement adjuster is a conveyance roller pair that nips and conveys the two-ply sheet PJ in the sheet separating operation and is movable in the width direction while the moving mechanism 46 is nipping the two-ply sheet PJ. The moving mechanism 46 moves the third conveyance roller pair 6 in the width direction (i.e., the direction indicated by bidirectional arrow in FIG. 14B). The moving mechanism 46 may include, for example, a holder that rotatably holds the third conveyance roller pair 6 and a rack and pinion mechanism that moves the holder in the width direction.

Before the sheet separating operation, the moving mechanism 46 moves the third conveyance roller pair 6 nipping the two-ply sheet PJ by a distance corresponding to the displacement amount $\alpha$ of the two-ply sheet PJ in the opposite direction to the direction in which the third conveyance roller pair 6 is displaced so as to cancel the displacement amount $\alpha$ in the width direction of the two-ply sheet PJ (i.e., the lateral registration) detected by the displacement detector 47.

As a result, the center position in the width direction of the two-ply sheet PJ coincides with the center reference Z (in other words, the desired position). Due to such a configuration, when compared with a configuration in which the center position is displaced from the center reference Z, the separation claws 16 are smoothly inserted into the gap C of the two-ply sheet PJ and a separation failure is less likely to occur.

Before the above-described displacement is adjusted, the third conveyance roller pair 6 is at the home position detected by the home position sensor 46*d*. The third conveyance roller pair 6 is then moved from the home position by a desired distance of movement corresponding to the displacement amount $\alpha$ of the two-ply sheet PJ in the width direction (obtained from the number of steps of the motor of the moving mechanism 46).

On the other hand, the third conveyance roller pair 6 may be controlled to be moved from the home position by the displacement amount $\alpha$ of the two-ply sheet PJ in the width direction in advance before the two-ply sheet PJ is nipped, and then be brought back to the home position after the two-ply sheet PJ is nipped. In this case, it is easy to control readjustment of the displacement of the two-ply sheet PJ corresponding to the displacement amount $\alpha'$ of the inner sheet PM in the width direction described below.

In the present embodiment, based on the displacement amount $\alpha'$ of the inner sheet PM in the width direction detected by the displacement detector 47 (serving as a displacement detector), after the sheet separating operation and before the sheet inserting operation, the third conveyance roller pair 6 (serving as a displacement adjuster) adjusts the relative positions of the inner sheet PM and the two-ply sheet PJ.

More specifically, as described above, the third conveyance roller pair 6 (serving as a displacement adjuster) adjusts the displacement amount $\alpha$ of the two-ply sheet PJ in the width direction to be zero, based on the displacement amount $\alpha$ of the two-ply sheet PJ in the width direction detected by the displacement detector 47 (serving as a displacement detector). Then, the sheet separating operation is performed. In other words, the sheet separating operation is performed while the center position in the width direction of the two-ply sheet PJ is matched with the center reference Z.

Then, before the sheet inserting operation, the third conveyance roller pair 6 (and the moving mechanism 46) moves the two-ply sheet PJ in the width direction so as to generate the displacement amount $\alpha$ of the two-ply sheet PJ in the width direction that is equal to the displacement amount $\alpha'$ of the inner sheet PM in the width direction, based on the displacement amount $\alpha'$ of the inner sheet PM in the width direction detected by the displacement detector 47. More specifically, the two-ply sheet PJ is moved by the same distance as the displacement amount $\alpha'$ of the inner sheet PM in the width direction in the direction same as the direction of displacement of the inner sheet PM.

As a result, even if the inner sheet PM is displaced, the center position in the width direction of the inner sheet PM matches the center position in the width direction of the two-ply sheet PJ. According to this configuration, it is less likely to cause such a failure in which the sheet inserting operation is performed while the inner sheet PM is relatively displaced in the width direction with respect to the two-ply sheet PJ (for example, the inner sheet PM is out from the two-ply sheet PJ).

Figure 15:
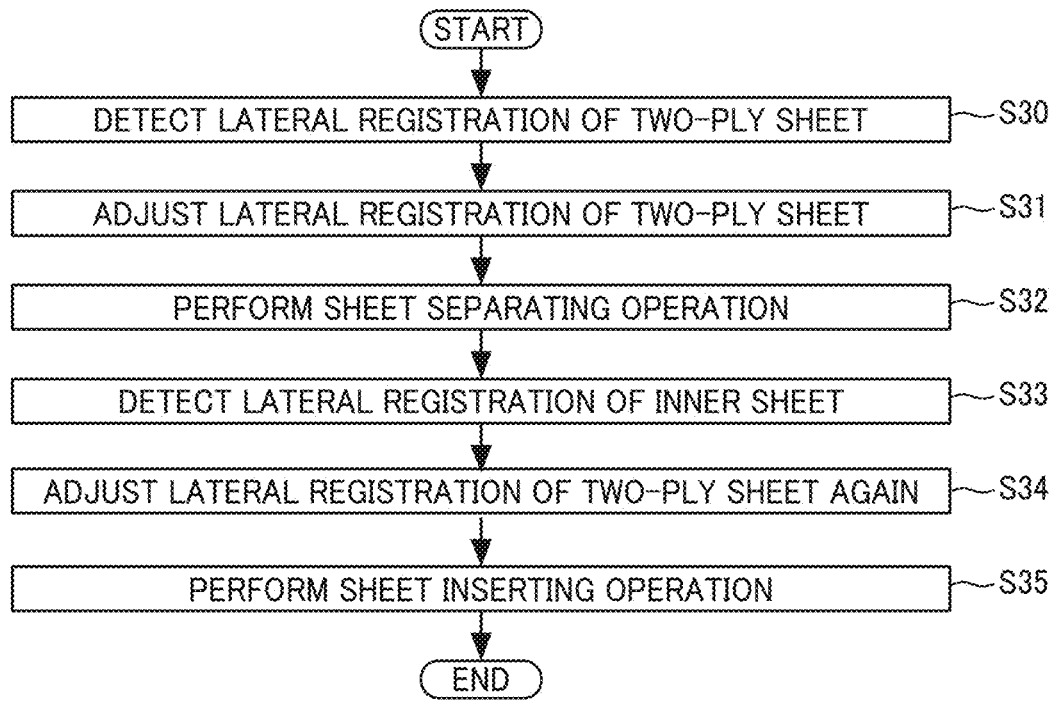
FIG. 15 is a flowchart illustrating the control process to adjust the relative positions of the two-ply sheet and an inner sheet.

A description is now given of the control in adjustment of the relative positions of the above-described two-ply sheet PJ and the inner sheet PM, with reference to FIG. 15. FIG. 15 is a flowchart illustrating the control process to adjust the relative positions of the two-ply sheet PJ and the inner sheet PM.

When the second conveyance roller pair 5 nips and conveys the two-ply sheet PJ, the displacement detector 47 detects the displacement amount $\alpha$ of the two-ply sheet PJ in the width direction (i.e., the lateral registration) (step S30). Then, after the third conveyance roller pair 6 nips the two-ply sheet PJ, the moving mechanism 46 moves the third conveyance roller pair 6 in the width direction to adjust the displacement amount $\alpha$ of the two-ply sheet PJ in the width direction (i.e., the lateral registration) (step S31). Subsequently, the displacement amount $\alpha$ of the two-ply sheet PJ in the width direction (i.e., the lateral registration) is adjusted, and then the sheet separation unit 19 performs the sheet separating operation on the two-ply sheet PJ (step S32).

Then, when the second conveyance roller pair 5 nips and conveys the inner sheet PM, the displacement detector 47 detects the displacement amount $\alpha$ of the inner sheet PM in the width direction (i.e., the lateral registration) (step S33). Subsequently, before the inner sheet PM reaches the sheet separation unit 19, the displacement amount in the width direction (i.e., the lateral registration) of the two-ply sheet PJ nipped by the third conveyance roller pair 6 is adjusted again to be aligned with the displacement amount $\alpha'$ of the inner sheet PM in the width direction (i.e., the lateral registration) (step S34).

Then, while the lateral center position of the two-ply sheet PJ and the lateral center position of the inner sheet PM are matched with each other, the inner sheet PM is inserted into the two-ply sheet PJ in the sheet inserting operation (step S35). Then, the flow of the control of adjustment of the relative positions of the two-ply sheet PJ and the inner sheet PM in the width direction ends.

Modification 1

A description is given of the sheet separation device 1 according to Modification 1 of an embodiment of the present disclosure.

Figure 16:
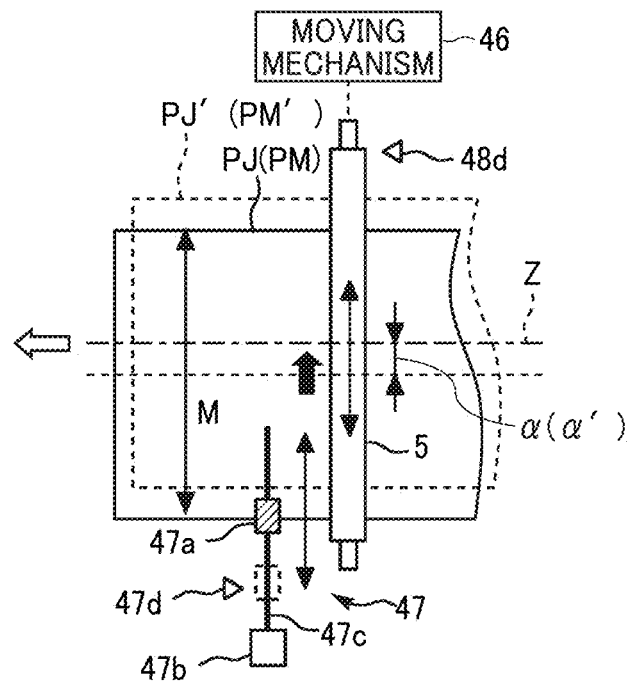
FIG. 16 is a top view of the displacement detector and the displacement adjuster and the area around the displacement detector and the displacement adjuster according to Modification 1 of an embodiment of the present disclosure.

FIG. 16 is a top view of the displacement detector and the displacement adjuster and the area around the displacement detector and the displacement adjuster according to Modification 1 of an embodiment of the present disclosure.

The sheet separation device 1 according to Modification 1 in FIG. 16 has the different control in adjustment of the relative positions of the two-ply sheet PJ and the inner sheet PM in the width direction, from the sheet separation device 1 with reference to FIGS. 14A, 14B, and 15. More specifically, as illustrated in FIG. 16, the sheet separation device 1 according to Modification 1 includes the second conveyance roller pair 5 serving as a conveyance roller pair disposed upstream from the sheet separation unit 19 in the sheet conveyance direction. The second conveyance roller pair 5 is movable in the width direction by the moving mechanism 46 while holding the two-ply sheet PJ or the inner sheet PM and functions as a displacement adjuster. In other words, in Modification 1, the second conveyance roller pair 5 functioning as a displacement adjuster adjusts the displacement of the two-ply sheet PJ and the displacement of the inner sheet PM. The moving mechanism 46 moves the second conveyance roller pair 5 in the width direction (i.e., the direction indicated by bidirectional arrow in FIG. 16). The moving mechanism 46 may include, for example, a holder that rotatably holds the second conveyance roller pair 5 and a rack and pinion mechanism that moves the holder in the width direction.

First, the second conveyance roller pair 5 (serving as a displacement adjuster) adjusts the displacement amount α of the two-ply sheet PJ in the width direction to be zero, based on the displacement amount α of the two-ply sheet PJ in the width direction detected by the displacement detector 47 (serving as a displacement detector). Then, the sheet separating operation is performed. Further, before the two-ply sheet PJ reaches the position of the third conveyance roller pair 6 that does not function as a displacement adjuster in Modification 1, the second conveyance roller pair 5 serving as a displacement adjuster moves to align the lateral center position of the two-ply sheet PJ with the center reference Z. Then, the sheet separation device 1 performs the sheet separating operation while the two-ply sheet PJ is nipped by the third conveyance roller pair 6.

Then, before the sheet inserting operation, based on the displacement amount α' of the inner sheet PM in the width direction detected by the displacement detector 47, the second conveyance roller pair 5 (serving as a displacement adjuster) adjusts the displacement amount α' of the inner sheet PM in the width direction to be zero. In other words, before the inner sheet PM reaches the position of the sheet separation unit 19, the second conveyance roller pair 5 moves to align the lateral center position of the inner sheet PM with the center reference Z. Then, the inner sheet PM is inserted into the two-ply sheet PJ at the position of the sheet separation unit 19, in other words, the sheet separation device 1 performs the sheet inserting operation.

By so doing, the lateral center position of the two-ply sheet PJ and the lateral center position of the inner sheet PM match with the center reference Z, respectively. According to this configuration, it is less likely to cause such a failure in which the sheet inserting operation is performed while the inner sheet PM is relatively displaced in the width direction with respect to the two-ply sheet PJ (for example, the inner sheet PM is out from the two-ply sheet PJ).

A description is now given of the control in adjustment of the relative positions of the two-ply sheet PJ and the inner sheet PM in the width direction in Modification 1, with reference to FIG. 17.

FIG. 17 is a flowchart illustrating the control process executed in the sheet separation device 1 of FIG. 16 to adjust the relative positions of the two-ply sheet and the inner sheet in the width direction.

When the second conveyance roller pair 5 nips and conveys the two-ply sheet PJ, the displacement detector 47 detects the displacement amount α of the two-ply sheet PJ in the width direction (i.e., the lateral registration) (step S30). Then, while the second conveyance roller pair 5 nips and conveys the two-ply sheet PJ, the moving mechanism 46 moves the second conveyance roller pair 5 in the width direction to adjust the displacement amount α (i.e., the lateral registration) of the two-ply sheet PJ in the width direction (step S31). Subsequently, the displacement amount α of the two-ply sheet PJ in the width direction (i.e., the lateral registration) is adjusted, and then the sheet separation unit 19 performs the sheet separating operation on the two-ply sheet PJ (step S32).

Then, when the second conveyance roller pair 5 nips and conveys the inner sheet PM, the displacement detector 47 detects the displacement amount α' of the inner sheet PM in the width direction (i.e., the lateral registration) (step S33). Subsequently, before the inner sheet PM reaches the sheet separation unit 19, the moving mechanism 46 moves the second conveyance roller pair 5 in the width direction to adjust the displacement amount α (i.e., the lateral registration) of the inner sheet PM in the width direction while the second conveyance roller pair 5 nips the inner sheet PM (step S37).

Then, while the lateral center position of the two-ply sheet PJ and the lateral center position of the inner sheet PM are matched with the center reference Z, respectively, the inner sheet PM is inserted into the two-ply sheet PJ in the sheet inserting operation (step S35). Then, the flow of the control of adjustment of the relation of lateral positions of the two-ply sheet PJ and the inner sheet PM ends.

As a result, the two sheets, which are the first sheet P1 and the second sheet P2, of the two-ply sheet PJ can be preferably separated, and the inner sheet PM can be inserted into the two-ply sheet PJ without causing the displacement of the inner sheet PM in the width direction.

Modification 2

A description is given of the sheet separation device 1 according to Modification 2, with reference to FIG. 18.

FIG. 18 is a top view of the third conveyance roller pair 6 serving as a displacement adjuster and the area around the third conveyance roller pair 6, according to Modification 2 of an embodiment of the present disclosure.

As illustrated in FIG. 18, the sheet separation device 1 according to Modification 2 includes a second displacement detector 48 serving as a displacement detector or a second displacement detector that detects the displacement amount β in the width direction (i.e., the lateral registration) of the two-ply sheet PJ nipped and conveyed by the third conveyance roller pair 6 serving as a displacement adjuster.

More specifically, the second displacement detector 48 includes an optical sensor 48a, an optical sensor motor 48b, a feed screw 48c, a guide rod, and a home position sensor 48d.

The optical sensor 48a is a reflection type photosensor disposed near (i.e., the left side in FIG. 18) the sheet separation unit 19. The optical sensor 48a is movable at one end (i.e., the lower end in FIG. 18) within a widthwise range corresponding to the size M of the two-ply sheet PJ in the width direction. Specifically, the optical sensor 48a has an internal thread and a through hole and is held to be movable in the width direction. The feed screw 48c extending in the width direction screws together with the internal thread. The guide rod disposed parallel to the feed screw 48c is inserted through the through hole. When the optical sensor motor 48b that is a forward and reverse rotation type is driven, the feed screw 48c is rotated in the forward and reverse directions. By so doing, the optical sensor 48a can be moved within a range indicated by a bidirectional arrow in FIG. 18.

Then, before the sheet inserting operation, based on the displacement amount β of the two-ply sheet PJ in the width direction detected by the second displacement detector 48 after the sheet separating operation, the third conveyance roller pair 6 adjusts the displacement amount β of the two-ply sheet PJ in the width direction to be zero. In other words, before the sheet separating operation and after the sheet inserting operation, the lateral center position of the two-ply sheet PJ is matched with the center reference Z again.

According to this configuration, even if the two-ply sheet PJ is displaced after the sheet separating operation, the displacement can be adjusted again. As a result, it is less likely to cause such a failure in which the sheet inserting operation is performed while the inner sheet PM is relatively displaced in the width direction with respect to the two-ply sheet PJ (for example, the inner sheet PM is out from the two-ply sheet PJ).

A description is now given of the control in adjustment of the relative positions of the two-ply sheet PJ and the inner sheet PM in the width direction in Modification 2, with reference to FIG. 19.

FIG. 19 is a flowchart illustrating the control process executed in the sheet separation device 1 of FIG. 18 to adjust the relative positions of the two-ply sheet PJ and the inner sheet PM in the width direction.

When the second conveyance roller pair 5 nips and conveys the two-ply sheet PJ, the displacement detector 47 (see FIG. 14A) detects the displacement amount α of the two-ply sheet PJ in the width direction (i.e., the lateral registration) (step S30). Then, after the third conveyance roller pair 6 nips the two-ply sheet PJ, the moving mechanism 46 moves the third conveyance roller pair 6 in the width direction to adjust the displacement amount α of the two-ply sheet PJ in the width direction (i.e., the lateral registration) (step S31). Subsequently, the displacement amount α of the two-ply sheet PJ in the width direction (i.e., the lateral registration) is adjusted, and then the sheet separation unit 19 performs the sheet separating operation on the two-ply sheet PJ (step S32).

Then, while the third conveyance roller pair 6 nips and conveys the two-ply sheet PJ, the displacement amount β of the two-ply sheet PJ in the width direction (i.e., the lateral registration) is detected, and the moving mechanism 46 moves the third conveyance roller pair 6 in the width direction to adjust the displacement amount β of the two-ply sheet PJ in the width direction (i.e., the lateral registration) (step S38).

Then, when the second conveyance roller pair 5 nips and conveys the inner sheet PM, the displacement detector 47 detects the displacement amount α' of the inner sheet PM in the width direction (i.e., the lateral registration) (step S33). Subsequently, before the inner sheet PM reaches the sheet separation unit 19, the displacement amount in the width direction (i.e., the lateral registration) of the two-ply sheet PJ nipped by the third conveyance roller pair 6 is adjusted again to be aligned with the displacement amount α of the inner sheet PM in the width direction (i.e., the lateral registration) (step S34).

Then, while the lateral center position of the two-ply sheet PJ and the lateral center position of the inner sheet PM are matched with each other, the inner sheet PM is inserted into the two-ply sheet PJ in the sheet inserting operation (step S35). Then, the flow of the control of adjustment of the relative positions of the two-ply sheet PJ and the inner sheet PM in the width direction ends.

As a result, the two sheets, which are the first sheet P1 and the second sheet P2, of the two-ply sheet PJ can be preferably separated, and the inner sheet PM can be inserted into the two-ply sheet PJ without causing the displacement of the inner sheet PM in the width direction.

In Modification 2, the detection of the displacement amount in the width direction (i.e., the lateral registration) before the sheet separating operation in step S30 may be performed not by the displacement detector 47 that is a first displacement detector (see FIG. 14A) but by the second displacement detector 48.

Modification 3

A description is now given of the control in adjustment of the relative positions of the two-ply sheet PJ and the inner sheet PM in the width direction in Modification 3, with reference to FIGS. 20A, 20B, 20C, 20D, and 20E.

FIGS. 20A, 20B, 20C, 20D, and 20E are top views, each illustrating the displacement detector 47 serving as a displacement detector and the area around the displacement detector 47, according to Modification 3 of an embodiment of the present disclosure.

The displacement detector according to Modification 3 illustrated in FIGS. 20A, 20B, 20C, 20D, and 20E may be a substitute for the displacement detector 47 illustrated in FIG. 14A or FIG. 16 or the second displacement detector 48 illustrated in FIG. 18.

Figure 20A:
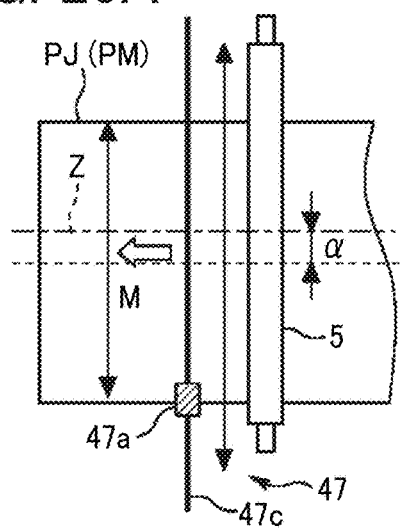
FIGS. 20A, 20B, 20C, 20D, and 20E are top views, each illustrating the displacement detector and the area around the displacement detector, according to Modification 3 of an embodiment of the present disclosure.

The optical sensor 47a of the displacement detector 47 (serving as a displacement detector) illustrated in FIG. 20A is movable in the entire area in the direction indicated by a bidirectional arrow in FIG. 20A, within a widthwise range corresponding to the size M of the two-ply sheet PJ or the inner sheet PM in the width direction. In such a configuration, the size M of the two-ply sheet PJ or the inner sheet PM in the width direction can be detected by the optical sensor 47a. For this reason, even if the size M of the two-ply sheet PJ or the inner sheet PM in the width direction is not identified, displacement of the two-ply sheet PJ or the inner sheet PM can be detected.

Figure 20B:
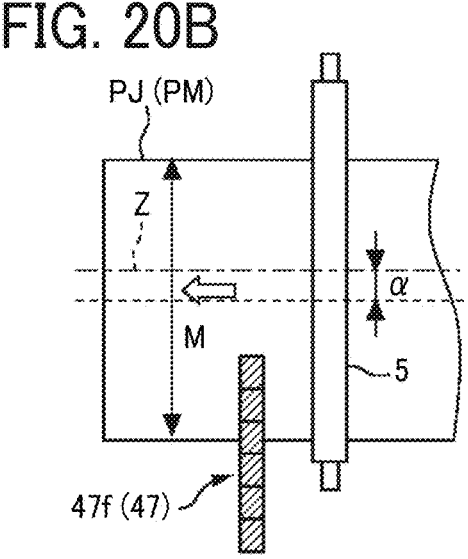

By contrast, the optical sensor of the displacement detector 47 (serving as a displacement detector) illustrated in FIG. 20B is a contact image sensor (CIS) 47f that is fixed to the one end (i.e., the lower end in FIG. 20B) with respect to the widthwise range corresponding to the size M of the two-ply sheet PJ or the inner sheet PM in the width direction. The CIS 47f includes a plurality of optical sensors arranged side by side in the width direction. The CIS 47f detects the position of the edge portion at the one end of the two-ply sheet PJ or the inner sheet PM based on the position of the optical sensor whose signal changes among the plurality of optical sensors. This configuration does not require a mechanism for moving the optical sensor.

Figure 20C:
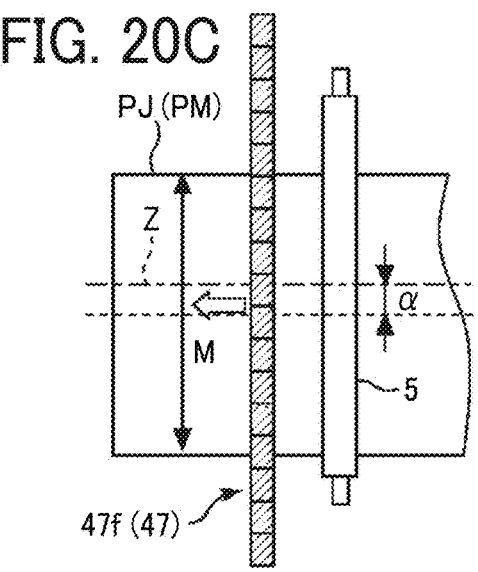

The optical sensor of the displacement detector 47 (serving as a displacement detector) illustrated in FIG. 20C is the CIS 47f that is fixed to the entire area with respect to the widthwise range corresponding to the size M of the two-ply sheet PJ or the inner sheet PM in the width direction. This configuration does not require a mechanism for moving the optical sensor and, even if the size M of the two-ply sheet PJ or the inner sheet PM in the width direction is not identified, displacement of the two-ply sheet PJ or the inner sheet PM can be detected.

Figure 20D:
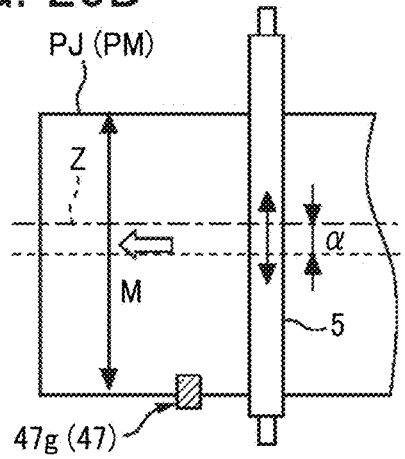

By contrast, an optical sensor 47g of the displacement detector 47 (serving as a displacement detector) illustrated in FIG. 20D is fixed to the one end (i.e., the lower end in FIG. 20D) with respect to the widthwise range corresponding to the size M of the two-ply sheet PJ or the inner sheet PM in the width direction. In this configuration, the second conveyance roller pair 5 is movable in the width direction to obtain the displacement amount α of the two-ply sheet PJ in the width direction or the inner sheet PM based on the position at which the optical sensor 47g detects the edge portion at the one end of the two-ply sheet PJ or the inner sheet PM nipped and conveyed by the second conveyance roller pair 5 (in other words, the amount of movement of the second conveyance roller pair 5) and the size M of the two-ply sheet PJ or the inner sheet PM in the width direction.

Figure 20E:
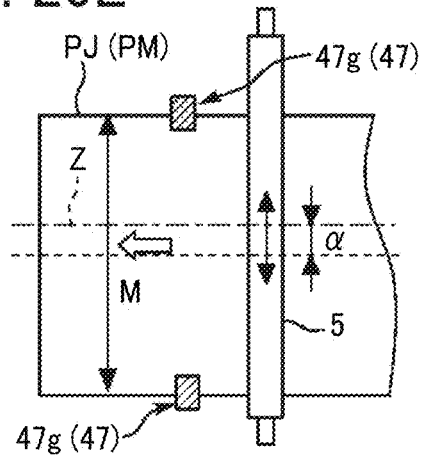

The optical sensors 47g of the displacement detector 47 (serving as a displacement detector) illustrated in FIG. 20E are fixed to both ends (i.e., the lower and upper ends in FIG. 20E) with respect to the widthwise range corresponding to the size M of the two-ply sheet PJ or the inner sheet PM in the width direction. In this configuration, the second conveyance roller pair 5 is movable in the width direction to obtain the displacement amount α of the two-ply sheet PJ in the width direction or the inner sheet PM based on the position at which the optical sensors 47g detect the edge portions at both ends of the two-ply sheet PJ or the inner sheet PM nipped and conveyed by the second conveyance roller pair 5 (in other words, the amount of movement of the second conveyance roller pair 5) and the size M of the two-ply sheet PJ or the inner sheet PM in the width direction.

As a result, in the configuration including any one of the displacement detectors illustrated in FIGS. 20A, 20B, 20C, 20D, and 20E, the two sheets, which are the first sheet P1 and the second sheet P2, of the two-ply sheet PJ can be preferably separated, and the inner sheet PM can be inserted into the two-ply sheet PJ without causing the displacement of the inner sheet PM in the width direction.

Modification 4

A description is now given of an operation display panel in Modification 4, with reference to FIG. 21.

FIG. 21 is a diagram illustrating display screen of the operation display panel 49, according to Modification 4 of an embodiment of the present disclosure.

In the sheet separation device 1 according to Modification 4, the displacement adjuster can change the adjustment amount of the position in the width direction to any value within a range in which the inner sheet PM (inner paper material) does not protrude in the width direction with respect to the two-ply sheet PJ (film) after the sheet inserting operation.

Specifically, referring to FIG. 21, a user or a service person operates the operation display panel 49 (see FIG. 1) to finely adjust the amount of movement of the third conveyance roller pair 6 serving as a displacement adjuster step by step. With such a configuration, even if an adjustment error occurs in the third conveyance roller pair 6 serving as a displacement adjuster, the user or the service person can correct the adjustment error.

Figures 22B, 23:
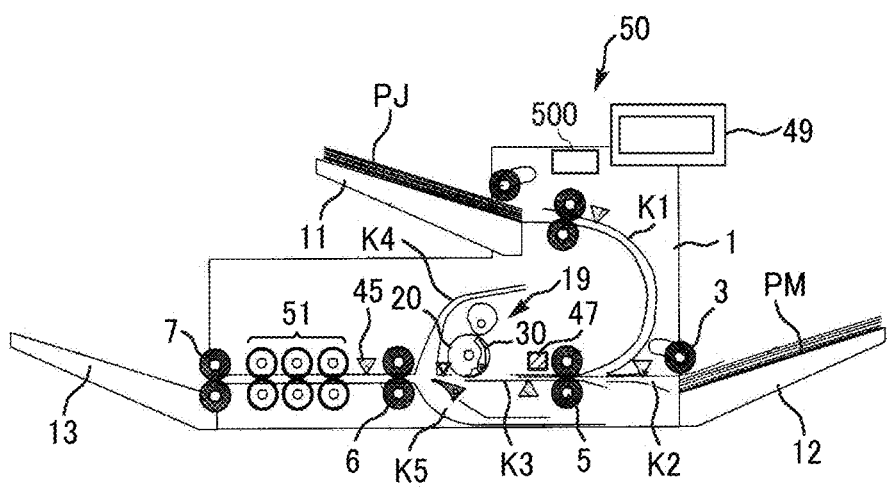

Further, FIGS. 22A and 22B are diagrams, each illustrating another display screen of the operation display panel 49.

As illustrated in FIGS. 22A and 22B, a user or a service person can operate the operation display panel 49 to input the size of the two-ply sheet PJ (film) or the inner sheet PM (inner paper material) or finely adjust the size in the width direction (i.e., the main scanning direction) or the size in the sheet conveyance direction (i.e., the sub-scanning direction) step by step. With this configuration, the two sheets, which are the first sheet P1 and the second sheet P2, of the two-ply sheet PJ can be more preferably separated, and the inner sheet PM can be inserted into the two-ply sheet PJ without causing the displacement of the inner sheet PM in the width direction.

Modification 5

A description is given of a sheet laminator according to Modification 5, with reference to FIG. 23.

FIG. 23 is a diagram illustrating a sheet laminator according to Modification 5 of an embodiment of the present disclosure.

As illustrated in FIG. 23, a sheet laminator 50 according to Modification 5 includes the sheet separation device 1 illustrated in FIG. 1.

The sheet laminator 50 includes a sheet lamination unit 51 disposed downstream from the third conveyance roller pair 6 of the sheet separation device 1 in the forward direction. The sheet lamination unit 51 performs a sheet laminating operation on the two-ply sheet PJ in which the inner sheet PM is inserted between the first sheet P1 and the second sheet P2 that are separated by the sheet separation device 1.

The sheet lamination unit 51 includes a plurality of thermal pressure roller pairs to apply heat and pressure to the two-ply sheet PJ while conveying the two-ply sheet PJ in the forward direction with the inner sheet PM being inserted in the two-ply sheet PJ. After the two-ply sheet PJ has passed through the sheet lamination unit 51, the entire region of the two-ply sheet PJ is bonded while the inner sheet PM is inserted in the two-ply sheet PJ. Then, the two-ply sheet PJ on which the sheet laminating operation has been performed as described above is ejected to the outside of the sheet lamination unit 51 by an ejection roller pair 7 to be stacked on the ejection tray 13.

As described above, the sheet laminator 50 according to Modification 5 performs the sheet laminating operation as a sequence of the following operations; an operation to feed the two-ply sheet PJ and the inner sheet PM; an operation to separate the first sheet P1 and the second sheet P2 of the two-ply sheet PJ; an operation to insert the inner sheet PM into the space between the first sheet P1 and the second sheet P2 separated from each other; and an operation to perform the sheet laminating operation on the two-ply sheet PJ inside which the inner sheet PM is inserted. By so doing, the user convenience for the sheet laminator 50 is enhanced.

In particular, once the leading end face of the two-ply sheet PJ is damaged, it is difficult to perform the sheet laminating operation on the damaged leading end face. For this reason, the configuration of the present disclosure is useful.

Since the sheet laminator 50 according to Modification 5 preferably separates the first sheet P1 and the second sheet P2 of the two-ply sheet PJ, the inner sheet PM can be inserted into the two-ply sheet PJ without causing the displacement of the two-ply sheet PJ in the width direction.

Modification 6

Figure 24:
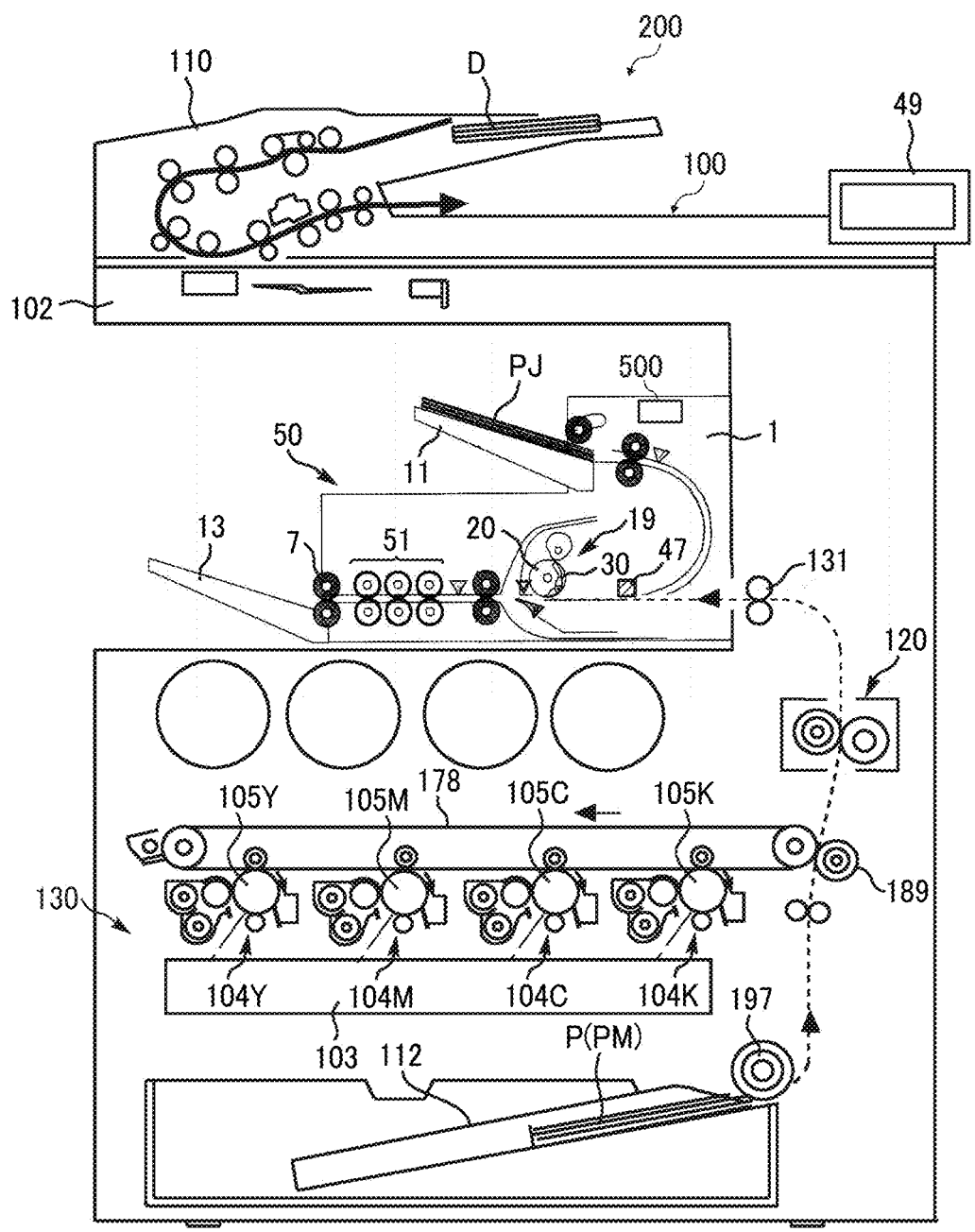
FIG. 24 is a diagram illustrating an image forming system according to Modification 6 of an embodiment of the present disclosure.

A description is given of an image forming system according to Modification 6, with reference to FIG. 24.

FIG. 24 is a diagram illustrating an image forming system according to Modification 6 of an embodiment of the present disclosure.

As illustrated in FIG. 24, an image forming system 200 according to Modification 6 includes an image forming apparatus 100 that forms an image on a sheet P and the sheet laminator 50 illustrated in FIG. 23, disposed on the image forming apparatus 100.

With reference to FIG. 24, the image forming apparatus 100 further includes a document feeder 110 and a document reading device 102. The document feeder 110 includes multiple pairs of sheet conveyance rollers to feed an original document D from a document loading table and convey the original document D in a direction indicated by arrow in FIG. 24. By so doing, the original document D passes over the document reading device 102. At this time, the document reading device 102 optically reads image data of the original document D while the original document D is passing over the document reading device 102.

The image data optically scanned by the document reading device 102 is converted into electrical signals. The electrical signals are then transmitted to a writing device 103. The writing device 103 emits laser beams onto photoconductor drums 105Y, 105M, 105C, and 105K, based on the electrical signals of the image data in each of colors, respectively, in the exposing process.

In the image forming apparatus 100, a charging process, the exposing process, and a developing process are sequentially executed on the photoconductor drums 105Y, 105M, 105C, and 105K of respective image forming units 104Y, 104M, 104C, and 104K to form desired images on the photoconductor drums 105Y, 105M, 105C, and 105K, respectively.

The images formed on the photoconductor drums 105Y, 105M, 105C, and 105K are then transferred and superimposed onto an intermediate transfer belt 178 to form a color image. The color image formed on the intermediate transfer belt 178 is further transferred onto the surface of a sheet P (which is to be the inner sheet PM) fed and conveyed from a feeding device 112 by a feed roller 197 at a position at which the intermediate transfer belt 178 faces a secondary transfer roller 189.

After the color image is transferred onto the surface of the sheet P (that is, the inner sheet PM), the sheet P is conveyed to the position of a fixing device 120. The fixing device 120 fixes the transferred color image formed on the surface of the sheet P, to the sheet P.

The sheet P is then ejected from the image forming apparatus 100 by an ejection roller pair 131, and is fed as the inner sheet PM, into the sheet laminator 50. The sheet laminator 50 including the sheet separation device 1 has completed the process described with reference to FIGS. 5A to 8C (in other words, the process to separate the two-ply sheet PJ) by the time that the inner sheet PM is fed into the sheet laminator 50 (the sheet separation device 1). After the inner sheet PM has been inserted into the sheet laminator 50 (the sheet separation device 1), the process described with reference to FIGS. 9A to 9C (in other words, the process to insert the inner sheet PM into the two-ply sheet PJ) is performed. Further, after the sheet lamination unit 51 has completed the sheet laminating operation on the two-ply sheet PJ in which the inner sheet PM is inserted, the ejection roller pair 7 ejects the two-ply sheet PJ to the outside of the sheet laminator 50 to stack the two-ply sheet PJ on the ejection tray 13.

As described above, a series of image forming processes (i.e., the printing operations) performed by the image forming apparatus 100 included in the image forming system 200 and a series of sheet separating operation performed on the two-ply sheet P by the sheet laminator 50 and the sheet laminating operation performed on the inner sheet PM by the sheet laminator 50 after the image is formed on the inner sheet PM by the image forming apparatus 100 are completed.

In Modification 6, the image forming system 200 includes the image forming apparatus 100 and the sheet laminator 50 disposed on the image forming apparatus 100. However, the image forming system 200 may include the image forming apparatus 100 and the sheet separation device 1 illustrated in FIG. 1 with the sheet separation device 1 being disposed on the image forming apparatus 100.

Further, the image forming apparatus 100 according to Modification 6 of the present disclosure is a color image forming apparatus but may be a monochrome image forming apparatus. Further, the image forming apparatus 100 according to Modification 6 of the present disclosure employs electrophotography, but the present disclosure is not limited to an electrophotographic image forming apparatus. For example, the present disclosure may be applied to other types of image forming apparatuses such as an inkjet image forming apparatus and a stencil printing machine.

The sheet laminator 50 included in the image forming system 200 according to Modification 6 of an embodiment of the present disclosure can preferably separate the two sheets, i.e., the first sheet P1 and the second sheet P2 of the two-ply sheet PJ and insert the inner sheet PM into the two-ply sheet PJ without causing the displacement of the inner sheet PM in the width direction.

Modification 7

Figure 25:
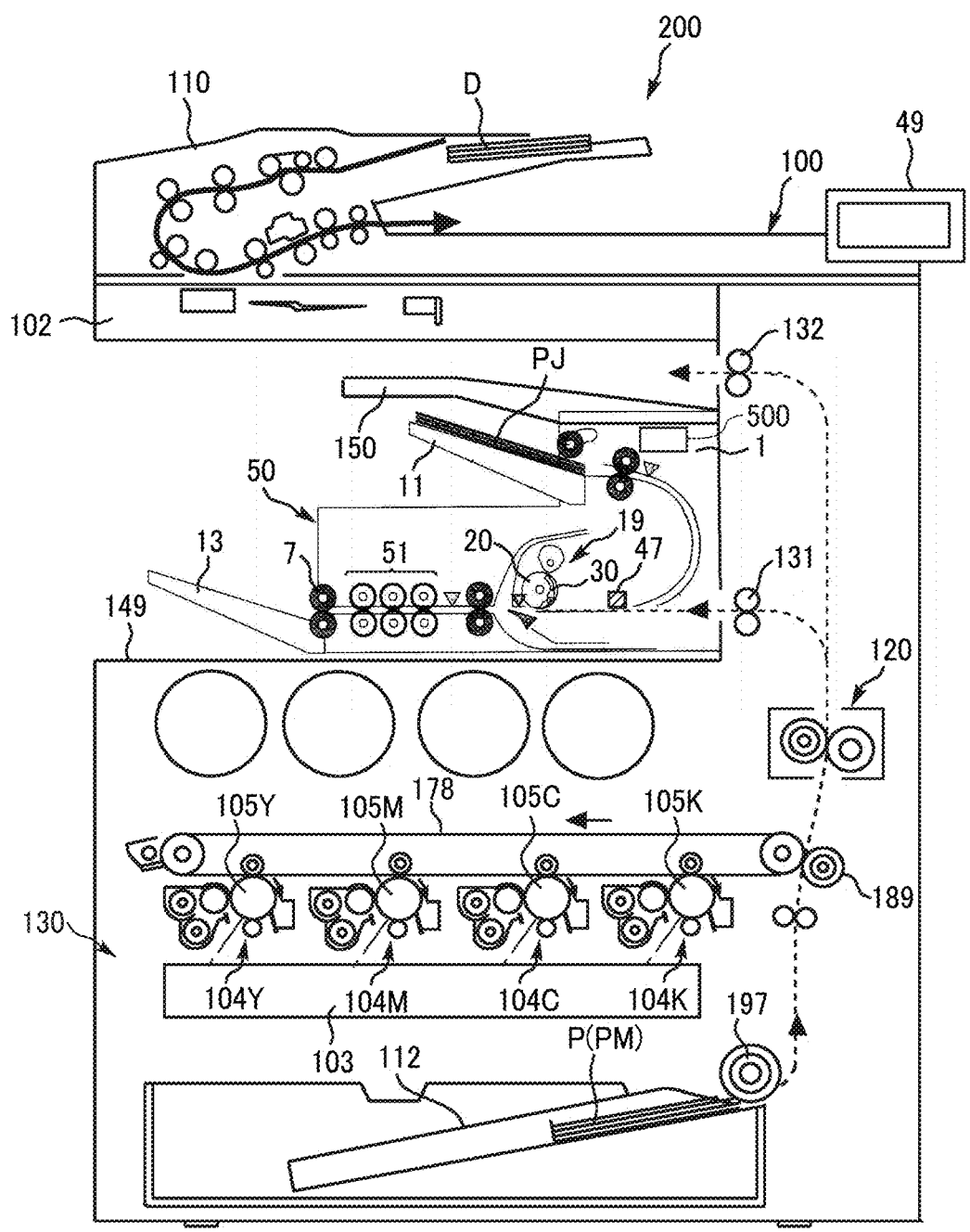
FIG. 25 is a diagram illustrating an image forming system according to Modification 7 of an embodiment of the present disclosure.

A description is given of an image forming system according to Modification 7, with reference to FIG. 25.

FIG. 25 is a diagram illustrating an image forming system according to Modification 7 of an embodiment of the present disclosure.

As illustrated in FIG. 25, an image forming system 200 according to Modification 7 includes the image forming apparatus 100 illustrated in FIG. 24 that forms an image on a sheet P, and the sheet laminator 50 illustrated in FIG. 23 that is detachably attached to the image forming apparatus 100.

In the image forming system 200 illustrated in FIG. 25, the image forming apparatus 100 performs the image forming processes on the sheet P, as described above with reference to FIG. 23. Then, the image forming apparatus 100 ejects the sheet P (that is, the inner sheet PM on which a desired image is formed) by the ejection roller pair 131 from the image forming apparatus 100 to the sheet laminator 50. After the sheet P is conveyed to the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the outside of the sheet laminator 50 to stack the two-ply sheet PJ on the ejection tray 13.

When the user selects a mode not to perform such a sheet laminating operation as described above, the sheet P on which an image is formed through the image formation process in the image forming apparatus 100 of the image forming system 200 is ejected by a second ejection roller pair 132 to the outside of the image forming apparatus 100 to be stacked on a second ejection tray 150.

The sheet laminator 50 is detachably attached to the image forming apparatus 100. When the sheet laminator 50 is not used, the sheet laminator 50 may be detached from the image forming apparatus 100. When the sheet laminator 50 is detached from the image forming apparatus 100, a placement surface 149 on which the sheet laminator 50 was installed functions as an ejection tray. For example, when the sheet P is ejected from the ejection roller pair 131 to the outside of the image forming apparatus 100, the sheet P on which a desired image is formed is stacked on the placement surface 149.

In Modification 7, the sheet laminator 50 is detachably attached to the image forming system 200. However, the sheet separation device 1 illustrated in FIG. 1 may be detachably attached to the image forming system 200.

The sheet laminator 50 included in the image forming system 200 according to Modification 7 can preferably separate the two sheets, i.e., the first sheet P1 and the second sheet P2 of the two-ply sheet PJ and insert the inner sheet PM into the two-ply sheet PJ without causing the displacement of the inner sheet PM in the width direction.

A description is given of an image forming system according to another embodiment of the present disclosure.

Figure 26A:
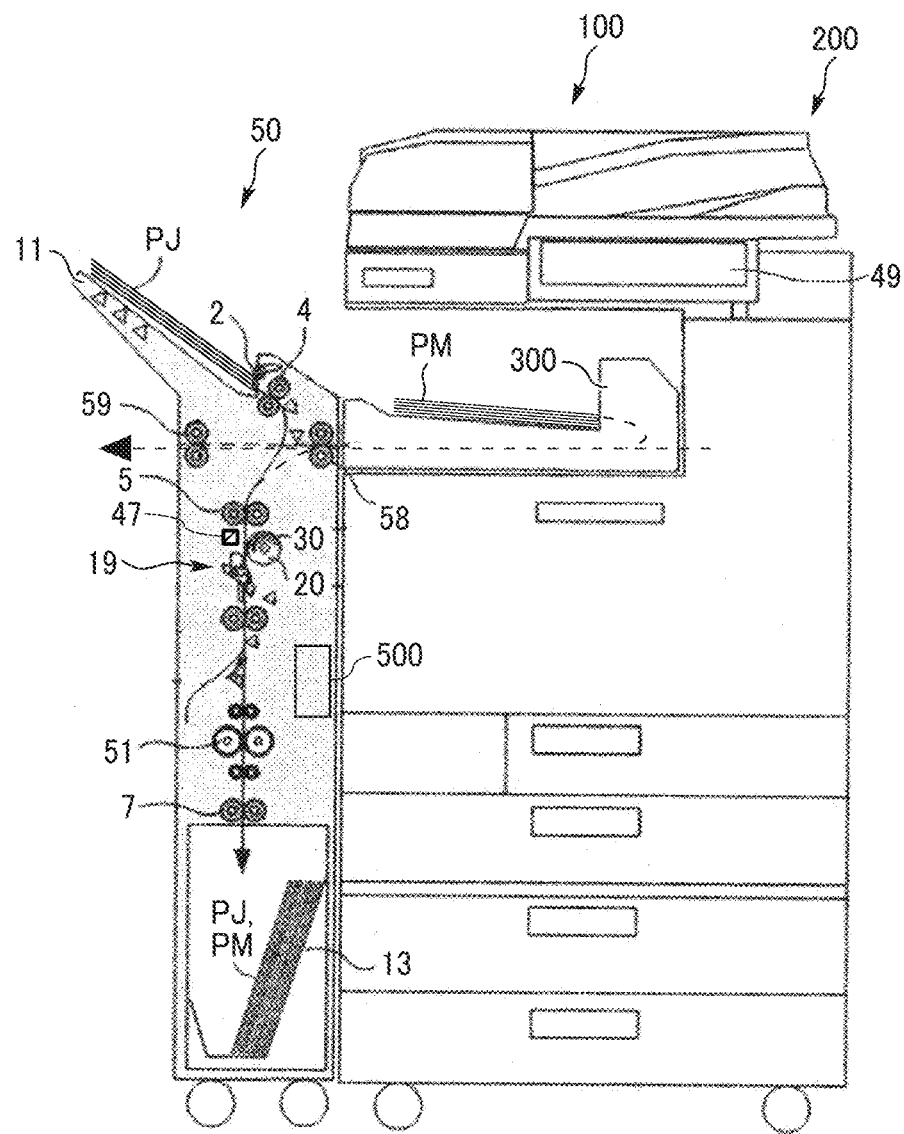
FIG. 26A is a diagram illustrating an image forming system, according to another embodiment of the present disclosure.

FIG. 26A is a diagram illustrating an image forming system, according to another embodiment of the present disclosure.

Figure 26B:
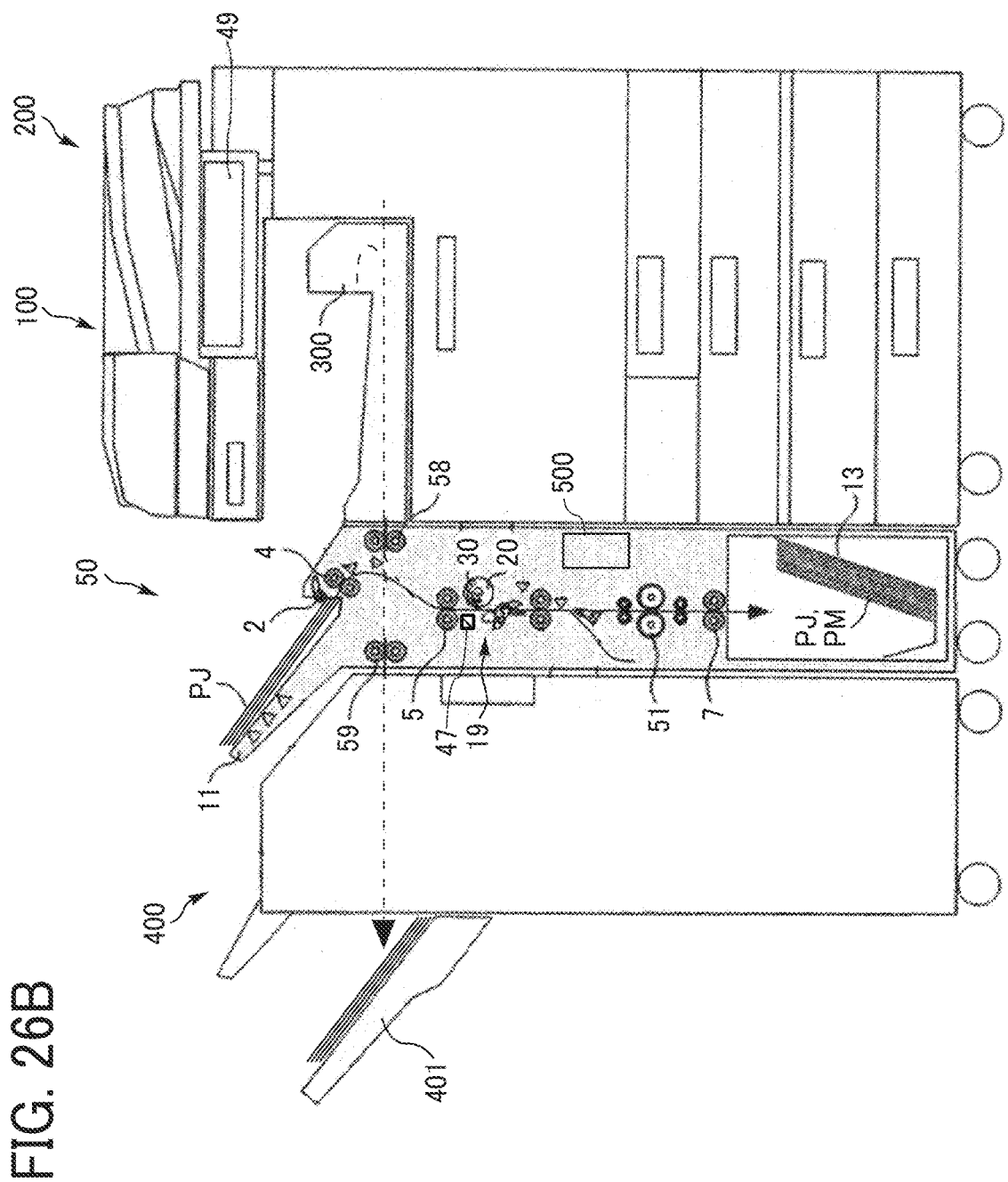
FIG. 26B is a diagram illustrating an image forming system, according to yet another embodiment of the present disclosure.

FIG. 26B is a diagram illustrating an image forming system, according to yet another embodiment of the present disclosure.

The image forming system 200 according to Modification 7 includes the sheet laminator 50 disposed in a space below the document feeder 110 of the image forming apparatus 100 and detachably attached to the image forming apparatus 100.

By contrast, like the image forming system 200 illustrated in FIG. 26A, the sheet laminator 50 may be detachably attached adjacent to the image forming apparatus 100, in other words, the sheet laminator 50 may be detachably attached to the image forming apparatus 100 on the side to which the sheet P having an image on the surface is ejected. In such a configuration of the sheet laminator 50, the first sheet tray 11 on which the two-ply sheets PJ are stacked, the sheet separation unit 19 (winding roller 20), the sheet lamination unit 51, and the ejection tray 13 are sequentially disposed in this order from top to bottom in the vertical direction. In addition to the sheet conveyance passage used to guide the inner sheet PM ejected from the image forming apparatus 100 to the sheet separation unit 19 (winding roller 20), the sheet laminator 50 may be provided with another sheet conveyance passage (defined by sheet conveyance roller pairs 58 and 59) used to eject the sheet P ejected from the image forming apparatus 100 without the sheet laminating operation on the sheet P.

The image forming system 200 may also be provided with a relay device 300 that guides the sheet P (including the inner sheet PM) ejected from the image forming apparatus 100 to the sheet laminator 50.

In this case, the inner sheet PM may be fed from the relay device 300.

Further, as the image forming system 200 illustrated in FIG. 26B, a post-processing apparatus 400 may be provided to perform the post-processing operations including the punching operation and the stapling operation, on the sheet P ejected from the image forming apparatus 100 through the sheet laminator 50. The sheet P may be with or without the sheet laminating operation. In such a case, the sheet P on which the post-processing operation has been performed is ejected to an ejection tray 401 of the post-processing apparatus 400.

As described above, the sheet separation device 1 according to the present embodiment includes the sheet separation unit 19 that performs the sheet separating operation and the sheet inserting operation. More specifically, the sheet separation unit 19 of the sheet separation device 1 performs the sheet separating operation to separate the non-bonding portion of the two-ply sheet PJ in which two sheets, which are the first sheet P1 and the second sheet P2, are overlapped and bonded together at one end of the two-ply sheet PJ as the bonding portion A of the two-ply sheet PJ. The sheet separation unit 19 of the sheet separation device 1 then performs the sheet inserting operation to insert the inner sheet PM between the first sheet P1 and the second sheet P2 separated from each other in the sheet separating operation. The sheet separation device 1 further includes the displacement detector 47 that can detect the displacement amount α in the width direction orthogonal to the sheet conveyance direction of the two-ply sheet PJ toward the sheet separation unit 19 and detect the displacement amount α' in the width direction of the inner sheet PM conveyed toward the sheet separation unit 19. The sheet separation device 1 further includes the third conveyance roller pair 6 (serving as a displacement adjuster) that can adjust the displacement amount α in the width direction of the two-ply sheet PJ before the sheet separating operation, based on the displacement amount α of the two-ply sheet PJ in the width direction detected by the displacement detector 47. Then, based on the displacement amount α' of the inner sheet PM in the width direction detected by the displacement detector 47, the third conveyance roller pair 6 (serving as a displacement adjuster) adjusts the relative positions of the inner sheet PM and the two-ply sheet PJ in the width direction after the sheet separating operation and before the sheet inserting operation.

As a result, the two sheets, which are the first sheet P1 and the second sheet P2 of the two-ply sheet PJ can be preferably separated, and the inner sheet PM can be inserted into the two-ply sheet PJ without causing the displacement of the inner sheet PM in the width direction.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

REFERENCE SIGNS LIST

1: sheet separation device
5: second conveyance roller pair (conveyance roller pair)
6: third conveyance roller pair (displacement adjuster, conveyance roller pair)
15: switching claw (switching plate)
16: separation claw (separation plate)
19: sheet separation unit
20: winding roller
46: moving mechanism (displacement adjuster)
47: displacement detector (displacement detector)
47a: optical sensor
47g: optical sensor
47f: CIS (optical sensor)
48: second displacement detector (second displacement detector)
49: operation display panel (operation display device)
50: sheet laminator
100: image forming apparatus
200: image forming system
P: sheet
P1: sheet
P2: sheet
PM: inner sheet PJ: two-ply sheet A: bonding portion The present disclosure may be applicable to, for example, a combination of the following Aspects 1 to 15.

Aspect 1

A sheet separation device comprising:
a sheet separation unit configured to:
perform a sheet separating operation of separating a non-bonding portion of a two-ply sheet in which two sheets are overlapped and bonded together at a bonding portion of the two-ply sheet; and
perform a sheet inserting operation of inserting an inner sheet between the two sheets of the two-ply sheet separated in the sheet separating operation;
a displacement detector configured to:
detect a displacement amount of the two-ply sheet in a width direction of the two-ply sheet orthogonal to a sheet conveyance direction in which the two-ply sheet is conveyed toward the sheet separation unit; and
detect a displacement amount of the inner sheet, which is conveyed toward the sheet separation unit, in the width direction;
a displacement adjuster configured to adjust a displacement of the two-ply sheet in the width direction before the sheet separating operation, based on the displacement amount of the two-ply sheet detected by the displacement detector; and
a controller configured to cause the displacement adjuster to adjust relative positions of the two-ply sheet and the inner sheet in the width direction between the sheet separating operation and the sheet inserting operation, based on the displacement amount of the inner sheet detected by the displacement detector.

Aspect 2

The sheet separation device according to Aspect 1,
wherein the controller is configured to:
perform the sheet separating operation after the displacement adjuster adjusts the displacement amount of the two-ply sheet to be zero, based on the displacement amount of the two-ply sheet detected by the displacement detector; and
cause the displacement adjuster to move the two-ply sheet in the width direction before the sheet inserting operation, to generate a displacement amount equal to the displacement amount of the inner sheet, based on the displacement amount of the inner sheet detected by the displacement detector.

Aspect 3

The sheet separation device according to Aspect 2,
wherein the displacement adjuster is a conveyance roller pair to nip and convey the two-ply sheet in the sheet separating operation and is movable in the width direction while nipping the two-ply sheet.

Aspect 4

The sheet separation device according to Aspect 3, further comprising another displacement detector configured to detect another displacement amount of the two-ply sheet that is nipped and conveyed by the conveyance roller pair, wherein the controller is configured to cause the conveyance roller pair to adjust said another displacement amount of the two-ply sheet to be zero before the sheet inserting operation, based on said another displacement amount of the two-ply sheet detected by said another displacement detector after the sheet separating operation.

Aspect 5

The sheet separation device according to Aspect 1,
wherein the controller is configured to:
perform the sheet separating operation after the displacement adjuster has adjusted the displacement amount of the two-ply sheet to be zero, based on the displacement amount of the two-ply sheet detected by the displacement detector; and
cause the displacement adjuster to adjust the displacement amount of the inner sheet to be zero before the sheet inserting operation, based on the displacement amount of the inner sheet detected by the displacement detector.

Aspect 6

The sheet separation device according to Aspect 5,
wherein the displacement adjuster is a conveyance roller pair disposed upstream from the sheet separation unit in the sheet conveyance direction and movable in the width direction while nipping the two-ply sheet or the inner sheet.

Aspect 7

The sheet separation device according to any one of Aspects 1 to 6,
wherein the displacement detector includes an optical sensor disposed upstream from the sheet separation unit in the sheet conveyance direction.

Aspect 8

The sheet separation device according to Aspect 7,
wherein the optical sensor is movable to one end or a whole area in a widthwise range corresponding to a size of the two-ply sheet or the inner sheet in the width direction.

Aspect 9

The sheet separation device according to Aspect 7,
wherein the optical sensor is a contact image sensor fixed on one end or a whole area in a widthwise range corresponding to a size of the two-ply sheet or the inner sheet in the width direction.

Aspect 10

The sheet separation device according to Aspect 7,
wherein the optical sensor is fixed at one end or both ends in a widthwise range corresponding to a size of the two-ply sheet or the inner sheet in the width direction.

Aspect 11

The sheet separation device according to any one of Aspects 1 to 10, wherein the displacement adjuster is configured to change an adjustment amount of the relative positions of the two-ply sheet and the inner sheet in the width direction to any value within a widthwise range in which the inner sheet does not exceed the two-ply sheet in the width direction after the sheet inserting operation.

Aspect 12

The sheet separation device according to any one of Aspects 1 to 11, further comprising a conveyance roller pair configured to convey the two-ply sheet toward the sheet separation unit,
wherein the sheet separation unit includes
a winding roller to rotate in a predetermined rotational direction to wind the two-ply sheet; and
a separation plate disposed between the winding roller and the conveyance roller pair and configured to be inserted into a gap between the two sheets.

Aspect 13

A sheet laminator comprising:
the sheet separation device according to any one of Aspects 1 to 12; and
a sheet lamination unit configured to perform a sheet laminating operation on the two-ply sheet in which the inner sheet is inserted between the two sheets separated from the two-ply sheet by the sheet separation device.

Aspect 14

An image forming system includes the sheet separation device according to any one of Aspects 1 to 12 or the sheet laminator according to Aspect 13, and an image forming apparatus to form an image on the inner sheet.

Aspect 15

An image forming system includes an image forming apparatus to form an image on the inner sheet, and the sheet separation device according to any one of Aspects 1 to 12 or the sheet laminator according to Aspect 13, being detachably attached to the image forming apparatus.

The above-described embodiments are illustrative and do not limit the present invention.

Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on and claims priority to Japanese Patent Application Nos. 2022-019403, filed on Feb. 10, 2022, and 2022-197154, filed on Dec. 9, 2022, in the Japan Patent Office, the entire disclosure of which is hereby incorporated by reference herein.

The invention claimed is:

1. A sheet separation device comprising:
a sheet separator configured to:
perform a sheet separating operation of separating a non-bonding portion of a two-ply sheet in which two sheets are overlapped and bonded together at a bonding portion of the two-ply sheet, and
perform a sheet inserting operation of inserting an inner sheet between the two sheets of the two-ply sheet separated in the sheet separating operation;
a displacement detector configured to,
detect a displacement amount of the two-ply sheet in a width direction of the two-ply sheet orthogonal to a sheet conveyance direction in which the two-ply sheet is conveyed toward the sheet separator, and
detect a displacement amount of the inner sheet, which is conveyed toward the sheet separator, in the width direction;
a displacement adjuster configured to adjust a displacement of the two-ply sheet in the width direction before the sheet separating operation based on the detected displacement amount of the two-ply sheet; and
processing circuitry configured to cause the displacement adjuster to adjust relative positions of the two-ply sheet and the inner sheet in the width direction between the sheet separating operation and the sheet inserting operation based on the detected displacement amount of the inner sheet.

2. The sheet separation device according to claim 1, wherein the processing circuitry is further configured to:
perform the sheet separating operation based on the detected displacement amount of the two-ply sheet after the displacement adjuster adjusts the displacement amount of the two-ply sheet to be zero; and
cause the displacement adjuster to move the two-ply sheet in the width direction to generate a displacement amount equal to the displacement amount of the inner sheet based on the detected displacement amount of the inner sheet before the sheet inserting operation.

3. The sheet separation device according to claim 2, wherein
the displacement adjuster is a conveyance roller pair configured to nip and convey the two-ply sheet in the sheet separating operation; and
the displacement adjuster is further configured to be movable in the width direction while nipping the two-ply sheet.

4. The sheet separation device according to claim 3, further comprising:
a second displacement detector configured to detect a second displacement amount of the two-ply sheet that is nipped and conveyed by the conveyance roller pair after the sheet separating operation, wherein
the processing circuitry is further configured to cause the conveyance roller pair to adjust the displacement amount of the two-ply sheet to be zero before the sheet inserting operation based on the detected second displacement amount of the two-ply sheet.

5. The sheet separation device according to claim 1, wherein the processing circuitry is further configured to:
perform the sheet separating operation after the displacement adjuster has adjusted the displacement amount of the two-ply sheet to be zero based on the detected displacement amount of the two-ply sheet; and
cause the displacement adjuster to adjust the displacement amount of the inner sheet to be zero before the sheet inserting operation based on the detected displacement amount of the inner sheet.

6. The sheet separation device according to claim 5, wherein
the displacement adjuster is a conveyance roller pair upstream from the sheet separator in the sheet conveyance direction; and
the displacer adjuster is configured to be movable in the width direction while nipping the two-ply sheet or the inner sheet.

7. The sheet separation device according to claim 1, wherein the displacement detector includes an optical sensor upstream from the sheet separator in the sheet conveyance direction.

8. The sheet separation device according to claim 7, wherein the optical sensor is configured to be movable to one end or a whole area in a widthwise range corresponding to a size of the two-ply sheet or the inner sheet in the width direction.

9. The sheet separation device according to claim 7, wherein the optical sensor is a contact image sensor fixed on one end or a whole area in a widthwise range corresponding to a size of the two-ply sheet or the inner sheet in the width direction.

10. The sheet separation device according to claim 7, wherein the optical sensor is fixed at one end or both ends in a widthwise range corresponding to a size of the two-ply sheet or the inner sheet in the width direction.

11. The sheet separation device according to claim 1, wherein the displacement adjuster is further configured to;
change an adjustment amount of the relative positions of the two-ply sheet and the inner sheet in the width direction to any value within a widthwise range in which the inner sheet does not exceed the two-ply sheet in the width direction after the sheet inserting operation.

12. The sheet separation device according to claim 1, further comprising:
a conveyance roller pair configured to convey the two-ply sheet toward the sheet separator, wherein
the sheet separator includes,
a winding roller configured to rotate in a desired rotational direction to wind the two-ply sheets, and
a separation plate between the winding roller and the conveyance roller pair, the separation plate configured to insert a gap between the two sheets.

13. A sheet laminator comprising:
the sheet separation device according to claim 1; and
a sheet lamination device configured to perform a sheet laminating operation on the two-ply sheet in which the inner sheet is inserted between the two sheets separated from the two-ply sheet by the sheet separation device.

14. An image forming system comprising:
an image forming apparatus configured to form an image on the inner sheet; and
the sheet laminator according to claim 13.

15. The image forming system according to claim 14, wherein the sheet laminator is configured to be detachably attached to the image forming apparatus.

16. An image forming system comprising:
an image forming apparatus configured to form an image on the inner sheet; and
the sheet separation device according to claim 1.

17. The image forming system according to claim 16, wherein the sheet separation device is configured to be detachably attached to the image forming apparatus.

* * * * *